US012640071B2

(12) United States Patent
Wu

(10) Patent No.: US 12,640,071 B2
(45) Date of Patent: May 26, 2026

(54) METHOD OF GENERATING COLOR MAPPING TABLE, METHOD OF CORRECTING COLOR, APPARATUS FOR GENERATING COLOR CORRECTION MODEL, APPARATUS FOR CORRECTING COLOR, COMPUTER READABLE MEDIUM, AND DISPLAY DEVICE

(71) Applicant: BOE TECHNOLOGY GROUP CO., LTD., Beijing (CN)

(72) Inventor: Yanhong Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 477 days.

(21) Appl. No.: 18/281,801

(22) PCT Filed: Jun. 30, 2022

(86) PCT No.: PCT/CN2022/102970
§ 371 (c)(1),
(2) Date: Sep. 13, 2023

(87) PCT Pub. No.: WO2024/000465
PCT Pub. Date: Jan. 4, 2024

(65) Prior Publication Data
US 2025/0022397 A1    Jan. 16, 2025

(51) Int. Cl.
*G09G 3/20* (2006.01)
*H04N 9/67* (2023.01)

(52) U.S. Cl.
CPC ............ *G09G 3/2003* (2013.01); *H04N 9/67* (2013.01); *G09G 2320/0242* (2013.01); *G09G 2340/06* (2013.01)

(58) Field of Classification Search
None
See application file for complete search history.

(56) References Cited

U.S. PATENT DOCUMENTS 9,858,844 B2 * 1/2018 Yata ..................... G09G 3/2003
12,087,234 B2 * 9/2024 Sung ..................... G09G 3/2003
(Continued)

FOREIGN PATENT DOCUMENTS

CN        101123080 A     2/2008
CN        105022755 A     11/2015
(Continued)

*Primary Examiner* — Mushfikh I Alam
(74) *Attorney, Agent, or Firm* — HOUTTEMAN LAW LLC

(57) ABSTRACT

A method of generating a color mapping table for correcting color of a display panel, including: establishing a sampling point space, according to first color coordinates of a plurality of sampling points in a first color space; and performing steps of a preset processing on each of the plurality of sampling points, to obtain target color coordinates of the sampling point in the first color space, and generating the color mapping table according to the first color coordinates and the target color coordinates of the plurality of sampling points, where the steps of the preset processing on each of the plurality of sampling point include: taking the sampling point as a source sampling point, and determining a target sampling point corresponding to the source sampling point; and processing the target sampling point, to obtain the target color coordinates.

14 Claims, 8 Drawing Sheets x coordinate

CIE 1931                    CIELAB (CIE 1976 L*.a*.b*)

(56) References Cited

U.S. PATENT DOCUMENTS

| | | | | |
|---|---|---|---|---|
| 2003/0081831 A1* | 5/2003 | Fukao | ..................... | H04N 1/6025 |
| | | | | 382/167 |
| 2004/0174549 A1 | 9/2004 | Shigeta | | |
| 2008/0049042 A1* | 2/2008 | Yang | ..................... | G09G 3/3607 |
| | | | | 345/589 |
| 2009/0034840 A1 | 2/2009 | Umeda et al. | | |
| 2019/0189081 A1* | 6/2019 | Fukasawa | .............. | H04N 1/603 |
| 2020/0219433 A1* | 7/2020 | Yim | ..................... | G09G 5/026 |
| 2020/0227006 A1* | 7/2020 | Yao | ..................... | G09G 3/006 |
| 2020/0302865 A1* | 9/2020 | Lu | ..................... | G09G 3/2003 |
| 2020/0413018 A1 | 12/2020 | Vilar et al. | | |
| 2021/0312850 A1* | 10/2021 | Kim | ..................... | G09G 3/3607 |
| 2021/0314581 A1* | 10/2021 | Ma | ..................... | H04N 19/117 |
| 2023/0335039 A1* | 10/2023 | Liou | ..................... | G09G 3/2096 |
| 2023/0336699 A1* | 10/2023 | Duan | ..................... | H04N 9/64 |
| 2024/0013750 A1* | 1/2024 | Lin | ..................... | G09G 5/06 |
| 2024/0078708 A1* | 3/2024 | Luo | ..................... | G06T 7/90 |

FOREIGN PATENT DOCUMENTS

| | | |
|---|---|---|
| CN | 104520921 B | 7/2017 |
| CN | 108681627 A | 10/2018 |
| CN | 109859702 A | 6/2019 |
| CN | 111292235 A | 6/2020 |
| CN | 111770320 A | 10/2020 |
| CN | 112017105 A | 12/2020 |

* cited by examiner

CIE 1931                    CIELAB (CIE 1976 L*.a*.b*)

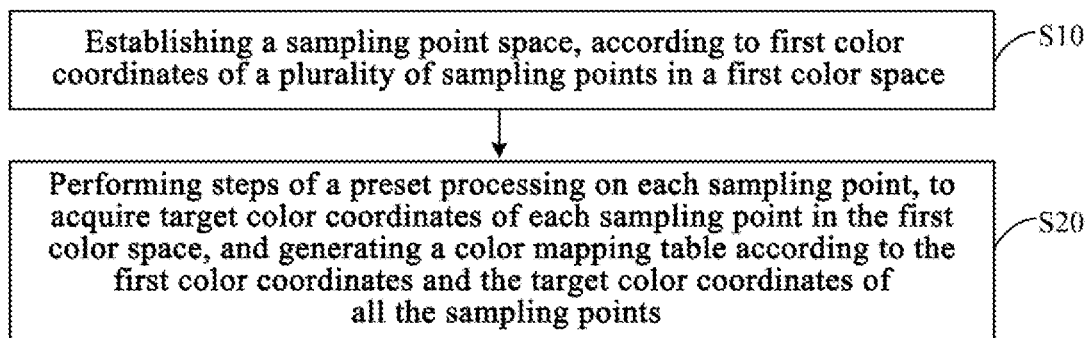

Establishing a sampling point space, according to first color coordinates of a plurality of sampling points in a first color space —S10

Performing steps of a preset processing on each sampling point, to acquire target color coordinates of each sampling point in the first color space, and generating a color mapping table according to the first color coordinates and the target color coordinates of all the sampling points —S20

FIG. 2

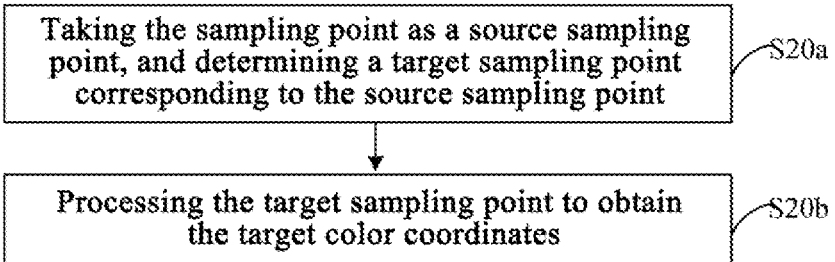

Taking the sampling point as a source sampling point, and determining a target sampling point corresponding to the source sampling point —S20a Processing the target sampling point to obtain the target color coordinates —S20b

FIG. 3A

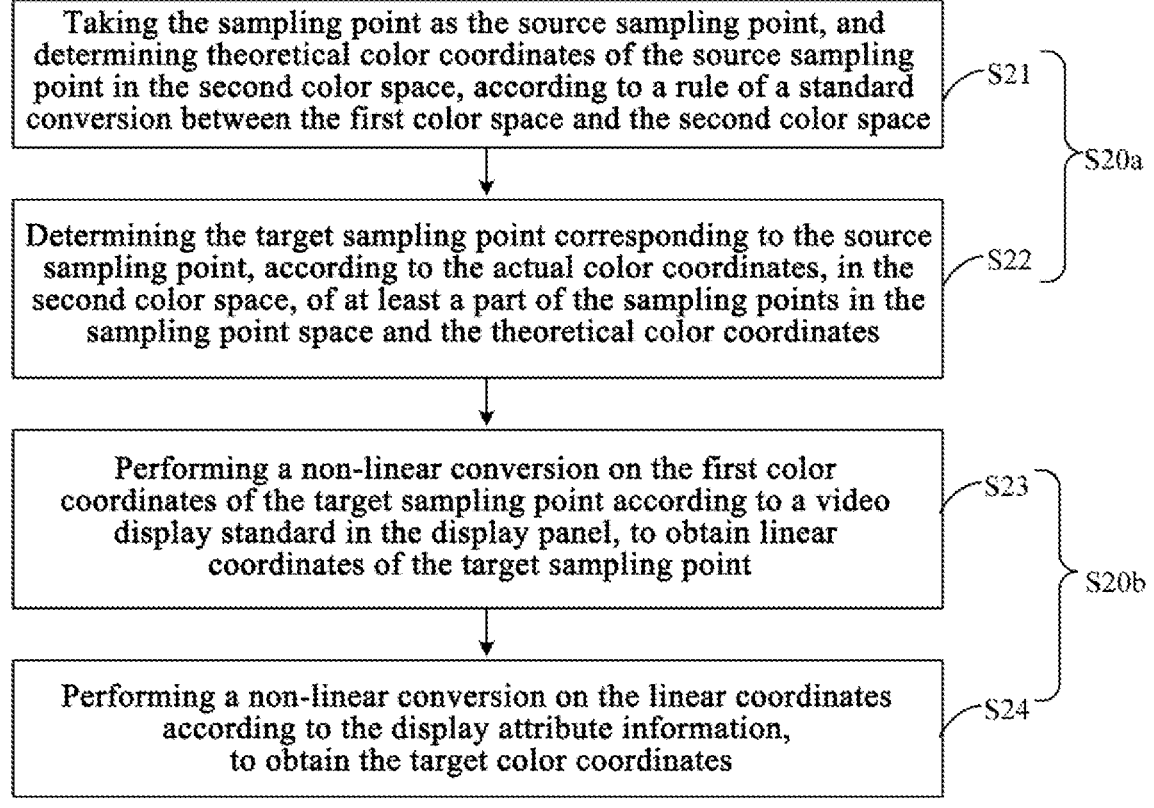

Taking the sampling point as the source sampling point, and determining theoretical color coordinates of the source sampling point in the second color space, according to a rule of a standard conversion between the first color space and the second color space —S21

Determining the target sampling point corresponding to the source sampling point, according to the actual color coordinates, in the second color space, of at least a part of the sampling points in the sampling point space and the theoretical color coordinates —S22

}—S20a

Performing a non-linear conversion on the first color coordinates of the target sampling point according to a video display standard in the display panel, to obtain linear coordinates of the target sampling point —S23

Performing a non-linear conversion on the linear coordinates according to the display attribute information, to obtain the target color coordinates —S24

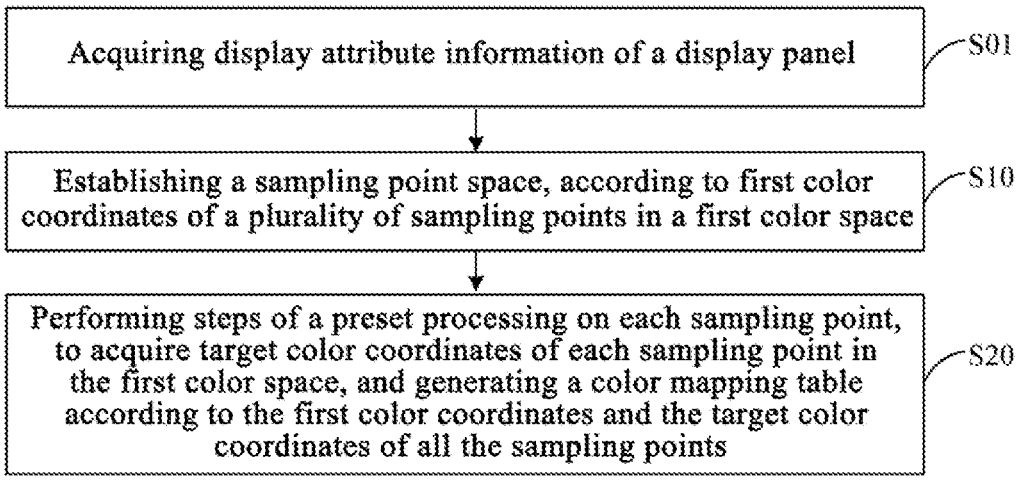

Acquiring display attribute information of a display panel — S01

Establishing a sampling point space, according to first color coordinates of a plurality of sampling points in a first color space — S10

Performing steps of a preset processing on each sampling point, to acquire target color coordinates of each sampling point in the first color space, and generating a color mapping table according to the first color coordinates and the target color coordinates of all the sampling points — S20

FIG. 4

Establishing a three-dimensional coordinate system, where the three-dimensional coordinate system includes a first coordinate axis extending along a first direction, a second coordinate axis extending along a second direction, and a third coordinate axis extending along a third direction — S11 setting multiple sampling points at equal intervals in the sampling point space along each of the first direction, the second direction and the third direction, according to a preset number of the sampling points, where every eight adjacent sampling points form a sampling cube with the eight adjacent sampling points being vertices of the sampling cube, and all the sampling cubes form the sampling point space — S12

FIG. 5A

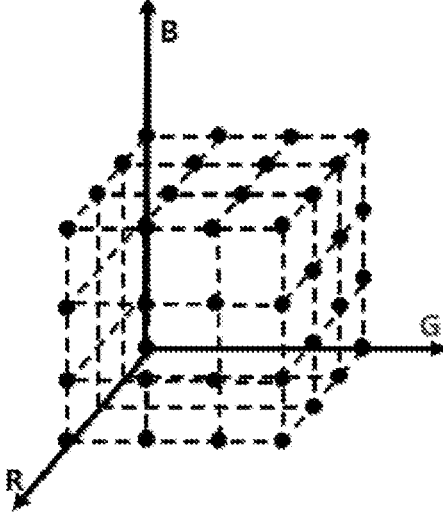

FIG. 5B

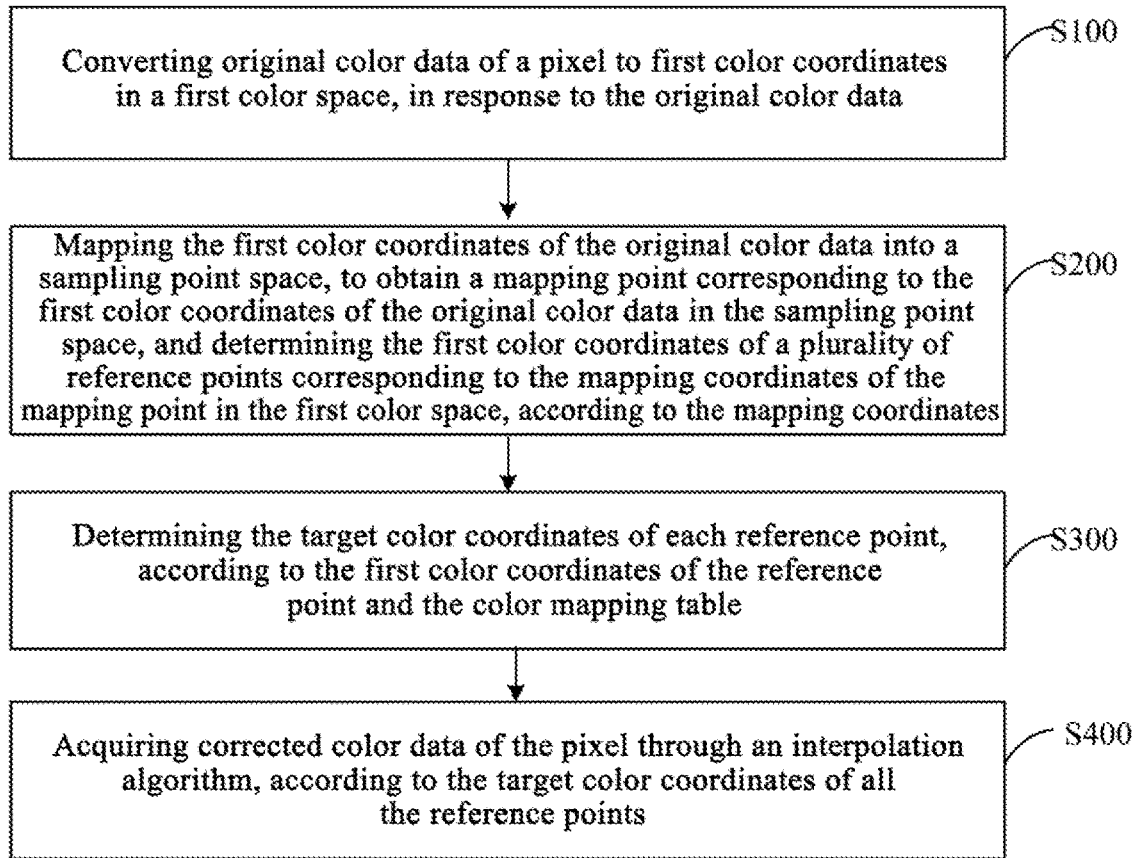

Converting original color data of a pixel to first color coordinates in a first color space, in response to the original color data — S100

Mapping the first color coordinates of the original color data into a sampling point space, to obtain a mapping point corresponding to the first color coordinates of the original color data in the sampling point space, and determining the first color coordinates of a plurality of reference points corresponding to the mapping coordinates of the mapping point in the first color space, according to the mapping coordinates — S200

Determining the target color coordinates of each reference point, according to the first color coordinates of the reference point and the color mapping table — S300

Acquiring corrected color data of the pixel through an interpolation algorithm, according to the target color coordinates of all the reference points — S400

FIG. 8

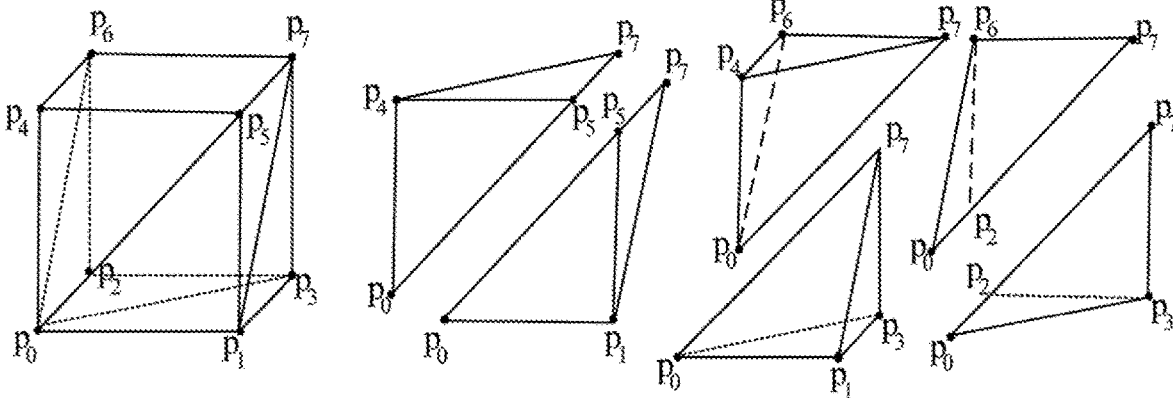

FIG. 9

Space establishing module ⟋10

Processing module ⟋20

Conversion module ⟋30

Reference point acquisition module ⟋40

Target color determination module ⟋50

Interpolation module ⟋60

1

METHOD OF GENERATING COLOR MAPPING TABLE, METHOD OF CORRECTING COLOR, APPARATUS FOR GENERATING COLOR CORRECTION MODEL, APPARATUS FOR CORRECTING COLOR, COMPUTER READABLE MEDIUM, AND DISPLAY DEVICE

TECHNICAL FIELD

The present disclosure relates to the field of display technology, and in particular to a method and an apparatus for generating a color mapping table, a method and an apparatus for correcting color, a computer storage medium, and a display device.

BACKGROUND

With the development of image and video technologies, people are increasingly pursuing more perfect display effect of video images. Among many image characteristics, color is one of the most direct perceptual attributes of the human visual system, and has been deeply and widely studied. Color management is a necessary function of a high-end display. Screens with differences in display characteristics can achieve the same color expression as a standard image, after colors of the screens are corrected.

SUMMARY

The present disclosure provides a method and an apparatus for generating a color mapping table, a method and an apparatus for correcting color, a computer storage medium, and a display device.

In a first aspect, an embodiment of the present disclosure provides a method of generating a color mapping table for correcting color of a display panel, including:

establishing a sampling point space, according to first color coordinates of a plurality of sampling points in a first color space; and performing steps of a preset processing on each of the plurality of sampling points, to obtain target color coordinates of the sampling point in the first color space, and generating the color mapping table according to the first color coordinates and the target color coordinates of the plurality of sampling points, where the steps of the preset processing on each of the plurality of sampling point include:

taking the sampling point as a source sampling point, and determining a target sampling point corresponding to the source sampling point; and processing the target sampling point, to obtain the target color coordinates.

In some embodiments, the taking the sampling point as a source sampling point, and determining a target sampling point corresponding to the source sampling point, includes:

taking the sampling point as the source sampling point, and determining theoretical color coordinates of the source sampling point in a second color space, according to a rule of a standard conversion between the first color space and the second color space; and determining the target sampling point corresponding to the source sampling point, according to actual color coordinates, in the second color space, of at least a part of the plurality of sampling points in the sampling point space and the theoretical color coordinates, where the actual color coordinates of the sampling point in the second color space are determined according to at least display attribute information of the display panel and the first color coordinates of the sampling point, where the processing the target sampling point, to obtain the target color coordinates, includes:

performing a non-linear conversion on the first color coordinates of the target sampling point, according to video display standard in the display panel, to obtain linear coordinates of the target sampling point; and performing non-linear conversion on the linear coordinates according to the display attribute information, to obtain the target color coordinates.

In some embodiments, the determining the target sampling point corresponding to the source sampling point, according to actual color coordinates, in the second color space, of at least a part of the plurality of sampling points in the sampling point space and the theoretical color coordinates, includes: performing at least one target search process, where each of the at least one target search process includes:

determining a search area of a sphere, by taking a first sampling point as a center of the sphere and a first preset value as a radius of the sphere;

if a coordinate difference between the actual color coordinates, in the second color space, of at least one sampling point in the search area of the sphere and the theoretical color coordinates is less than a preset threshold value, taking one of the at least one sampling point as the target sampling point; and otherwise, determining whether a current target search process is in an $N^{th}$ target search process, if so, taking the sampling point corresponding to a minimum coordinate difference obtained in previous N target search processes as the target sampling point; if not, getting into a next target search process, where N is a preset integer greater than 1; the first sampling point in a first target search process is the source sampling point; in each target search process subsequent to the first target search process, the first sampling point is the sampling point corresponding to the minimum coordinate difference obtained in a previous target search process.

In some embodiments, the taking one of the at least one sampling point as the target sampling point, includes:

taking the sampling point corresponding to the minimum coordinate difference in the at least one sampling point as the target sampling point.

In some embodiments, the first preset value is greater than or equal to a difference between RGB coordinates of a color of same color coordinates in different color gamuts.

In some embodiments, prior to the performing steps of a preset processing on each of the plurality of sampling points, the method further includes:

acquiring display attribute information of the display panel, where the display attribute information includes a mapping relationship between input colors and output colors of the display panel and a gamma curve of the display panel, where the mapping relationship represents a relationship between third color coordinates of actually displayed color in a third color space and linear coordinates of test color data, when the display panel displays in response to the test color data, and the linear coordinates of the test color data are obtained by performing a non-linear conversion on the first color coordinates of the test color data in the first color space according to the gamma curve.

In some embodiments, the first color space is a RGB space, the second color space is LAB space, and the third color space is an XYZ space.

In some embodiments, the establishing a sampling point space, according to first color coordinates of a plurality of sampling points in a first color space, includes:

establishing a three-dimensional coordinate system, where the three-dimensional coordinate system includes a first coordinate axis extending along a first direction, a second coordinate axis extending along a second direction, and a third coordinate axis extending along a third direction; and setting multiple sampling points at equal intervals in the sampling point space along each of the first direction, the second direction and the third direction, according to a preset number of the sampling points, where every eight adjacent sampling points form a sampling cube with the eight adjacent sampling points being vertices of the sampling cube, and all the sampling cubes form the sampling point space, where the coordinates of the sampling points in the sampling point space coincide with the first color coordinates of the sampling points.

In some embodiments, the taking the sampling point as the source sampling point, and determining theoretical color coordinates of the source sampling point in a second color space, according to a rule of a standard conversion between the first color space and the second color space, includes:

converting the first color coordinates of the source sampling point in the first color space to the linear coordinates, according to a video display standard for the display panel;

determining color coordinates of the source sampling point in a third color space, according to the linear coordinates and a rule of a conversion between the first color space and the third color space; and determining the theoretical color coordinates of the source sampling point in the second color space, according to the color coordinates of the source sampling point in the third color space and a rule of a conversion between the third color space and the second color space.

In a second aspect, an embodiment of the present disclosure provides a method of correcting color, including:

in response to original color data of a pixel, converting the original color data to first color coordinates in a first color space;

mapping the first color coordinates of the original color data into a sampling point space, to obtain a mapping point corresponding to the first color coordinates of the original color data in the sampling point space, and determining the first color coordinates of a plurality of reference points corresponding to mapping coordinates of the mapping point in the first color space, according to the mapping coordinates of the mapping point;

determining target color coordinates of each of the plurality of reference points, according to the first color coordinates of the reference point and a color mapping table, where the color map is generated through the above method of generating a color mapping table; and acquiring corrected color data of the pixel through an interpolation algorithm, according to the target color coordinates of the plurality of reference points.

In some embodiments, the sampling point space includes a plurality of sampling cubes, each of the plurality of sampling cubes is defined by eight sampling points as vertices of the sampling cube, and the sampling cube is divided into a plurality of tetrahedrons; and

the determining the first color coordinates of a plurality of reference points corresponding to mapping coordinates of the mapping point in the first color space, according to the mapping coordinates of the mapping point, includes:

determining the tetrahedron where the mapping point is located, and taking each vertex of the tetrahedron as the reference point; and taking the coordinates of the reference point in the sampling point space as the first color coordinates of the reference point.

In some embodiments, the acquiring corrected color data of the pixel through an interpolation algorithm, according to the target color coordinates of the plurality of reference points, includes:

acquiring the corrected color data of the pixel according to the following formula:

$$\hat{f}(p) = [f(p_0)f(p_1)f(p_2)f(p_3)] \begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix}^{-1} \begin{bmatrix} x \\ y \\ z \\ 1 \end{bmatrix},$$

where p represents the mapping point, and $p_0$, $p_1$, $p_2$ and $p_3$ represent the vertices of the tetrahedron where the mapping point is located; $\hat{f}(p)$ is the corrected color data; $f(p_0)$, $f(p_1)$, $f(p_2)$, and $f(p_3)$ are the target color coordinates of the four vertices of the tetrahedron, respectively; $(x_0, y_0, z_0)$ are coordinates of the vertex $p_0$ with respect to a datum point; $(x_1, y_1, z_1)$ are coordinates of the vertex $p_1$ with respect to the datum point, $(x_2, y_2, z_2)$ are coordinates of the vertex $p_2$ with respect to the datum point, $(x_3, y_3, z_3)$ are coordinates of the vertex $p_3$ with respect to the datum point; and $(x, y, z)$ are coordinates of the first mapping point with respect to the datum point, where the datum point is one of the four vertices of the tetrahedron where the mapping point is located.

In a third aspect, an embodiment of the present disclosure provides an apparatus for generating a color mapping table, including:

a space establishing module configured to establish a sampling point space according to first color coordinates of a plurality of sampling points in a first color space; and a processing module configured to perform steps of a preset processing on each of the plurality of sampling points, to obtain target color coordinates of the sampling point in the first color space, and generate the color mapping table according to the first color coordinates and the target color coordinates of the plurality of sampling points, where the steps of the preset processing on each of the plurality of sampling points include:

taking the sampling point as a source sampling point, and determining a target sampling point corresponding to the source sampling point; and processing the target sampling point to obtain the target color coordinates.

In a fourth aspect, an embodiment of the present disclosure provides an apparatus for correcting color, including:

a conversion module configured to convert, in response to original color data of a pixel, the original color data to first color coordinates in a first color space;

a reference point acquisition module configured to map the first color coordinates of the original color data to a sampling point space, to obtain a mapping point corresponding to the first color coordinates of the original color data in the sampling point space, and determine the first color coordinates, in the first color space, of a plurality of reference points corresponding to mapping coordinates of the mapping point, according to the mapping coordinates of the mapping point;

a target color determination module configured to determine target color coordinates of each of the plurality of reference points, according to the first color coordinates of the reference point and a color mapping table, where the color map table is generated through the above apparatus for generating a color mapping table; and an interpolation module configured to acquire corrected color data of the pixel through an interpolation algorithm, according to the target color coordinates of the plurality of reference points.

In a fifth aspect, an embodiment of the present disclosure provides a computer readable medium storing a computer program which, when being executed by a processor, cause the processor to perform any one method described above.

In a sixth aspect, an embodiment of the present disclosure provides a display device, including:

one or more processors; and a memory for storing one or more programs which, when being executed by the one or more processors, cause the one or more processors to perform any one method described above.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. In the drawings:

FIG. 2 is a schematic diagram illustrating a method of generating a color mapping table provided in some embodiments of the present disclosure.

FIG. 3A is a schematic diagram illustrating steps of a preset processing provided in some embodiments of the present disclosure.

FIG. 3B is a schematic diagram illustrating steps of a preset processing provided in other embodiments of the present disclosure.

FIG. 4 is a schematic diagram illustrating a method of generating a color mapping table according to an embodiment of the disclosure.

FIG. 5A is a flow chart illustrating an alternative implementation of step S10 provided in some embodiments of the present disclosure.

FIG. 5B is a schematic diagram illustrating a sampling point space provided in some embodiments of the present disclosure.

FIG. 8 is a schematic diagram illustrating a method of correcting color provided in some embodiments of the present disclosure.

FIG. 9 is a schematic diagram illustrating a sampling cube divided into a plurality of tetrahedrons provided in some embodiments of the present disclosure.

DETAIL DESCRIPTION OF EMBODIMENTS

Figure 1A:
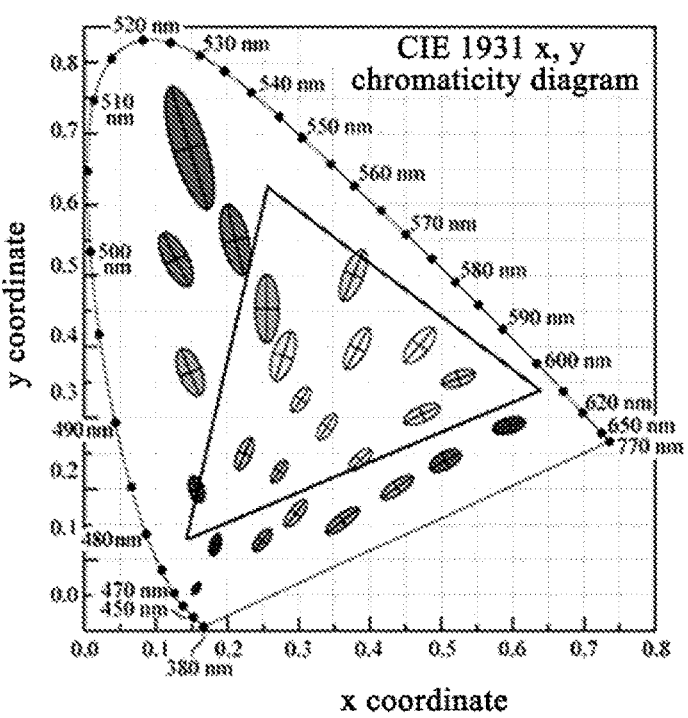
FIG. 1A is a schematic diagram illustrating a distribution rule of color tolerances at different positions in a chromaticity diagram.

In order to make one of ordinary skill in the art better understand the technical solution of the present disclosure, a method and an apparatus for generating a color mapping table, a method and an apparatus for correcting color, a display device, and a computer readable medium provided in the present disclosure are described in detail below with reference to the accompanying drawings.

Example embodiments will be described more fully hereinafter with reference to the accompanying drawings, and may be embodied in different forms and should not be construed as limited to the embodiments set forth herein. Rather, these embodiments are provided so that this disclosure will be thorough and complete, and will fully convey the scope of the present disclosure to one of ordinary skill in the art.

The term used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the term "comprises" or "comprising", when used in this specification, may specify the presence of stated features, integers, steps, operations, elements, and/or components, but do not preclude the presence or addition of one or more other features, integers, steps, operations, elements, components, and/or groups thereof.

It will be understood that, although the terms "first", "second", etc. may be used herein to describe various elements, these elements should not be limited by these terms. These terms are only used to distinguish one element from another element. Therefore, a first element, a first component, or a first module discussed below could be termed a second element, a second component, or a second module without departing from the teachings of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Before describing the embodiments of the present disclosure, a color space and related concepts thereof involved in the present disclosure will be described first.

CIE-1931 XYZ color space: the international commission on illumination (CIE) defined a color space model, i.e., CIE 1931 XYZ color space, in 1931 for the first time in a purely mathematical manner. The CIE 1931 XYZ color space covers all colors that the human eye can perceive, not depending on any particular physical implementation. When a color is represented in XYZ form, a consistent color is rendered on any display that supports the XYZ standard, regardless of the specific physical characteristics of the display. The XYZ coordinates contain energy information of a light source, so the value has no upper limit.

CIE-1931 xyY color space: three orthogonal quantities x, y, z may be derived from the CIE tristimulus values, that is, $$x = X/(X+Y+Z), \ y = Y/(X+Y+Z), \ z = Z/(X+Y+Z).$$

The x, y components are used to measure chromaticity of a color, and a brightness (luminance) of the color is designed to be represented by the Y component of the tristimulus values. This is the CIE xyY space.

The basis for defining the CIE-1931 xyY color space is the fact that for a given color, if its brightness is increased, a luminous flux of each primary color is also increased proportionally, and a ratio of X:Y:Z remains the same, so that this color can be matched. Since the chromaticity values are only dependent on the wavelength (hue) and purity, but not on the total radiant energy, X, Y and Z may be normalized by the total radiant energy (X+Y+Z) when calculating the chromaticity of the color. Alternatively, considering only a case of a cross section of X+Y+Z=1, the color equation is simplified to x+y+z=1. Since z may be derived from x+y+z=1, the color may be represented by only x and y.

color gamut: a color gamut refers to a sum of colors that a color system is capable of producing. A color gamut in a narrow sense refers specifically to the technical capabilities of a color display system (such as a display and a printer). The CIE chromaticity diagram contains all colors visible to the human eye. This color gamut is somewhat too large for a color display system to support completely, and a practical system often supports only a sub-space within the chromaticity diagram, which is usually determined by the x and y values of the three primary colors. The three primary colors enclose a triangle, which determines the maximum range of colors that a color system can produce.

Mathematically, the color gamut triangle contains an infinite number of color points, while the actual display system is digitized, so that a series of discrete points need to be selected from a continuous color gamut according to a certain rule, to form a color gamut actually supported by the system. If the system represents colors with 8 bits, 256× 256×256=16,777,216 colors are included in the color gamut.

Monitors and commercial displays have a unique display color gamut after manufacturing the monitors and commercial displays. A goal of color correction is to present a true color of an input signal with a display having a unique color gamut. That is, color coordinates x, y values of the input signal are equal to the actually measured x, y values after outputting. For the same input signal, theoretical X, Y, Z values are obtained from R, G, B values of the input signal after standard conversion steps, then the theoretical x and y values are obtained according to the theoretical X, Y, Z values. On the other hand, corrected R, G, B values are obtained from R, G, B values of the input signal through a color mapping table, then displayed X, Y, Z values are obtained according to the corrected R, G, B values, then displayed x, y values are obtained according to the displayed X, Y, Z values. If the displayed x, y values are consistent with the theoretical x, y values, then the color correction is finished. In the process of converting the R, G, B values of the input signals to the theoretical X, Y, Z values, the used standard conversion steps include two parts: the first part is to perform a non-linear conversion (EOTF) to convert the R, G, B values (non-linear signals) of the input signal to linear signals, where the rule of the non-linear conversion are related to the video display standard. The second part is to convert the linear R, G, B values to values in XYZ space.

Color tolerance: color tolerances at different positions in the chromaticity diagram are different from each other. FIG. 1A is a schematic diagram illustrating a distribution rule of color tolerances at different positions in a chromaticity diagram. In FIG. 1A, a size of the ellipse is enlarged to be approximately 10 times of the actual value, for a highlighting effect. In FIG. 1A, the color coordinates within the same ellipse are different from each other, but the human eye cannot distinguish the difference. The parts whose colors are close to each other may find close target values.

Perceptually uniform color space: a color space is said to be perceptually uniform if it satisfies that a unit amount of change of a color value at an arbitrary position always corresponds to a same amount of perceptual change. A perceptually uniform space is characterized by equal color tolerance everywhere, regardless of the specific color values. The CIE-1931 xyY space is perceptually non-uniform in terms of this definition.

Figure 1B:
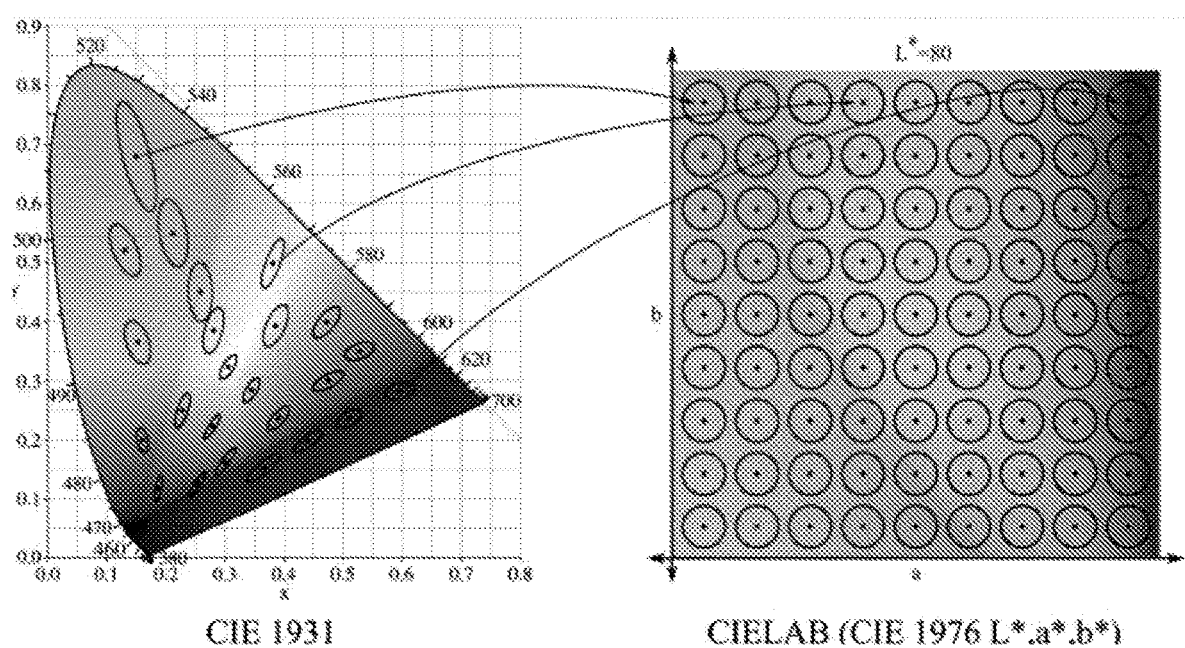
FIG. 1B is a diagram illustrating a comparison between a distribution of color tolerances in a chromaticity diagram and a distribution of color tolerances in a CIELAB color space.

In order to unify the calculation and comparison of colors, CIE again introduced a uniform color space. The CIE L*a*b* color space, also known as CIELAB, has a major advantage that a distance between colors better fits a linear relationship with human perception, especially an accuracy of describing darker colors is higher. A slight deficiency is that the linear relationship varies somewhat when describing the yellow region, i.e., the circle of color tolerance varies in diameter around yellow. FIG. 1B is a diagram illustrating a comparison between a distribution of color tolerances in a chromaticity diagram and a distribution of color tolerances in CIELAB color space. As can be seen in FIG. 1B, CIELAB color space is a perceptually uniform color space.

The mathematical definition of the CIELAB color model is:

$$\begin{cases} L^* = 116 f(Y/Y_n) - 16 \\ a^* = 500[f(X/X_n) - f(Y/Y_n)], \\ b^* = 200[f(Y/Y_n) - f(Z/Z_n)] \end{cases} \quad (0\text{--}1)$$

where $$f(X/X_n) = \begin{cases} (X/X_n)^{1/3} & X/X_n > 0.008856 \\ 7.787(X/X_n) + 16/116 & X/X_n \le 0.008856 \end{cases} \quad (0\text{--}2)$$

$$f(Y/Y_n) = \begin{cases} (Y/Y_n)^{1/3} & Y/Y_n > 0.008856 \\ 7.787(Y/X_n) + 16/116 & Y/Y_n \le 0.008856 \end{cases}$$

$$f(Z/Z_n) = \begin{cases} (Z/Z_n)^{1/3} & Z/Z_n > 0.008856 \\ 7.787(Z/Z_n) + 16/116 & Z/Z_n \le 0.008856 \end{cases}$$

In the above formulas, L* represents the lightness of the color in a range of 0 to 100; a* and b* represent the chromaticity in a range of −128 to 128, where a* represents a red-green axis (red is positive, and green is negative), b* represents a yellow-blue axis (yellow is positive, and blue is negative), Xn, Yn, Zn represent X, Y, Z values of white light, respectively.

An embodiment of the present disclosure provides a method of generating a color mapping table, where the color mapping table is used for performing color correction on a display panel. FIG. 2 is a schematic diagram illustrating a method of generating a color mapping table provided in some embodiments of the present disclosure. As shown in FIG. 2, the method of generating a color mapping table includes the following steps S10 to S20.

Step S10, establishing a sampling point space, according to first color coordinates of a plurality of sampling points in a first color space.

In some embodiments, the first color space may be any one of HSV (hue, saturation, Value) color space, YUV (brightness, chromaticity) color space, CMYK (cyan, magenta, yellow, black) color space, RGB (red, green, blue) color space.

In some embodiments, the sampling point space is a space defined by three coordinate axes, and there are a plurality of sampling points in the sampling point space. For example, the first color space is RGB color space, the first color coordinates are $(R_j, G_j, B_j)$, which represent the R value, the G value, and the B value of the sampling point in the first color space, respectively. The three coordinate axes of the sampling point space may be used to represent the R value, the G value, and the B value of the sampling point, respectively, or may be used to represent used to represent the normalized R value, the normalized G value, and the normalized B value of the sampling point, respectively.

Step S20, performing steps of a preset processing on each sampling point, to acquire target color coordinates of each sampling point in the first color space, and generating a color mapping table according to the first color coordinates and the target color coordinates of all the sampling points.

FIG. 3A is a schematic diagram illustrating steps of a preset processing provided in some embodiments of the present disclosure. As shown in FIG. 3A, the steps of the preset processing on each sampling point includes the following steps S20a and S20b.

Step S20a, taking the sampling point as a source sampling point, and determining a target sampling point corresponding to the source sampling point.

Theoretical color coordinates and actual color coordinates of the source sampling point in a second color space, and actual color coordinates of other sampling points in the second color space can be acquired, and the target sampling point is a sampling point with the actual color coordinates close to the theoretical color coordinates of the source sampling point.

Step S20b, processing the target sampling point to obtain the target color coordinates.

In the embodiment of the disclosure, for each sampling point in the sampling point space, the corresponding target sampling point is determined through the preset processing step, and the target sampling point is processed to obtain the target color coordinate, so that the first color coordinates and the target color coordinates of each sampling point are recorded in the generated color mapping table. When correcting color of a certain pixel using the color mapping table, one or more sampling points corresponding to the pixel can be determined according to the first color coordinates of the pixel and the first color coordinates of each sampling point in the color mapping table, and then corrected color data of the pixel is determined according to the target color coordinates of the one or more sampling points.

FIG. 3B is a schematic diagram illustrating steps of a preset processing provided in other embodiment of the present disclosure, and FIG. 3B illustrates a specific embodiment of steps of a preset processing shown in FIG. 3A. As shown in FIG. 3B, the steps of the preset processing on each sampling point includes steps S20a and S20b.

Step S20a, taking the sampling point as the source sampling point, and determining target the sampling point corresponding to the source sampling point. Step S20a may specifically include steps S21 and S22.

Step S21, taking the sampling point as the source sampling point, and determining theoretical color coordinates of the source sampling point in the second color space, according to a rule of a standard conversion between the first color space and the second color space.

Step S22, determining the target sampling point corresponding to the source sampling point, according to the actual color coordinates, in the second color space, of at least a part of the sampling points in the sampling point space and the theoretical color coordinates. The actual color coordinates of each sampling point in the second color space are determined according to at least the display attribute information of the display panel and the first color coordinates of the sampling point.

In some embodiments, the target sampling point may be a sampling point with actual color coordinates close to the theoretical color coordinate. For example, a difference between the actual color coordinates of the target sampling point in the second color space and the theoretical color coordinates is less than a preset threshold; or the difference between the actual color coordinates of the target sampling point in the second color space and the theoretical color coordinates is less than the difference between the actual color coordinates of other sampling points and the theoretical color coordinates.

In some embodiments, the display attribute information of the display panel is information capable of showing a physical characteristic of the display panel. In one example, the display attribute information may include a gamma curve of the display panel and a mapping relationship between input color and output color of the display panel, which may be expressed as a mapping relationship between linear RGB coordinates and XYZ coordinates. According to the mapping relationship between the input color and the output color of the display panel and the first color coordinates of the sampling point, the color coordinates of the color actually displayed by the display panel in the XYZ space can be determined, and further the actual color coordinates of the target sampling point in the second color space thereby can be obtained. Specifically, the following description is made in conjunction with the mapping relationship between the input color and the output color of the display panel, and details are not described ahead here.

Step S20b, processing the target sampling point to obtain the target color coordinates. Step S20b may specifically include steps S23 and S24.

Step S23, performing a non-linear conversion on the first color coordinates of the target sampling point according to a video display standard in the display panel, to obtain linear coordinates of the target sampling point.

In some embodiments, the first color coordinates of each sampling point in the first color space are non-linear coordinates, and in step S23, the non-linear coordinates may be converted to linear coordinates according to a rule of non-linear conversion corresponding to the video display standard.

Step S24, performing a non-linear conversion on the linear coordinates according to the display attribute information, to obtain the target color coordinates.

The gamma curve of the display panel can be used to perform the non-linear conversion on the linear coordinates.

In the embodiment of the disclosure, for one source sampling point in the sampling point space, the target sampling point corresponding to the source sampling point is determined according to the actual color coordinates of at least a part of the sampling points in the second color space and the theoretical color coordinates, and the non-linear conversion is performed on the first color coordinates of the target sampling point according to the video display standard, to obtain the linear coordinates, and then the display attribute information of the display panel is used for performing the non-linear conversion on the linear coordinates, to obtain the target color coordinates. In this case, when the display panel displays according to the target color coordinates, the actual color displayed is close to or consistent with the color represented by the first color coordinates of the source sampling point. Therefore, with the color mapping table obtained by the above method, the color correction can be better performed.

In some embodiments, the first color space is the RGB color space, and the second color space is the LAB color space. Since the LAB color space is a perceptually uniform color space, when the actual color coordinates of the target sampling point in the second color space are close to the theoretical color coordinates of the source sampling point in the second color space, the display panel displays according to the target color coordinates, and the display color is closer to the color represented by the source sampling point.

FIG. 4 is a schematic diagram illustrating a method of generating a color mapping table provided in some embodiments of the present disclosure. As shown in FIG. 4, the manner of generating a color mapping table includes step S01, which is performed prior to step S20, for example, may be performed prior to step S10.

Step S01, acquiring display attribute information of a display panel. The display attribute information includes a mapping relationship between input color and output color of the display panel and a gamma curve of the display panel. The mapping relationship represents a relationship between the third color coordinates of actually displayed color in the third color space and the linear coordinates of test color data, when the display panel displays in response to the test color data. The linear coordinates of the test color data are obtained by performing non-linear conversion on the first color coordinates of the test color data in the first color space according to the gamma curve.

For example, the first color space is RGB color space, and the third color space is XYZ color space. The first color coordinates of the test color data in the first color space are marked as (Ri, Gi, Bi). Ri traverses 0 to 255, Gi traverses 0 to 255, and Bi traverses 0 to 255, resulting in 256×256×256 test color data. In step S01, each time the display panel displays the test color data, the color displayed by the display panel is captured, and the third color coordinates of the color displayed by the display panel in the third color space is acquired. In addition, the linear coordinates of the test color data are obtained according to the gamma curve of the display panel and the first color coordinates (Ri, Gi, Bi), so as to obtain a mapping relationship between the third color coordinates and the linear coordinates of the test color data, that is, a mapping relationship between the XYZ coordinates and the linear RGB coordinates. When capturing the color displayed on the display panel, a color analyzer (e.g., CA 410) may be used to capture the color.

The gamma curve of the display panel may be expressed as $$y_{output} = x_{input}^{\gamma},$$

where $y_{output}$ is a brightness displayed on the display panel, $$x_{input}^{\gamma}$$

is the input gray scale of the display panel. The input gray scale may be in a range of 0 to 255. If the input gray scale is 0, it means that the display panel displays a color of Ri=0, Gi=0, Bi=0; if the input gray scale is 1, it means that the display panel displays a colors of Ri=1, Gi=1, Bi=1; and so on. According to the input gray scale and the brightness displayed on the display panel, the gamma curve can be fitted. The linear coordinates of the test color data are marked as (Ri', Gi', Bi'), then Ri'=(Ri)$^{1/\gamma}$; Gi'=(Gi)$^{1/\gamma}$; Bi'= (Bi)$^{1/\gamma}$.

It should be noted that, in the above example, the display color of the display panel is of 8 bits, and when the display color of the display panel is of other number of bits, the value ranges of Ri, Gi, and Bi are different.

FIG. 5A is a flow chart illustrating an alternative implementation of step S10 provided in some embodiments of the present disclosure. As shown in FIG. 5A, step S10 includes:

Step S11, establishing a three-dimensional coordinate system, where the three-dimensional coordinate system includes a first coordinate axis extending along a first direction, a second coordinate axis extending along a second direction, and a third coordinate axis extending along a third direction.

Step S12, setting multiple sampling points at equal intervals in the sampling point space along each of the first direction, the second direction and the third direction, according to a preset number of the sampling points. Every eight adjacent sampling points form a sampling cube with the eight adjacent sampling points being vertices of the sampling cube, and all the sampling cubes form the sampling point space. The coordinates of the sampling point in the sampling point space are consistent with the first color coordinates of the sampling point. For example, the first color space is the RGB space, and three coordinate axes of the three-dimensional coordinate system are used to represent the R value, the G value, and the B value of the sampling point in the first color space, respectively.

FIG. 5B is a schematic diagram illustrating a sampling point space provided in some embodiments of the present disclosure. As shown in FIG. 5B, each black dot represents one sampling point. A plurality of sampling points are uniformly distributed in the sampling point space. It should be noted that, the number of the sampling points in FIG. 5B is only an example, and the specific number may be set as required. For example, in the sampling point space, eight points (0, 0, 0), (0, 255, 0), (255, 0, 0), (0, 0, 255), (0, 255, 255), (255, 0, 255) define a large cube, and the large cube is equally divided into 16 parts in any one of three directions, to obtain 16×16×16 sampling cubes. The vertices of the sampling cubes are the sampling points, and there are 17×17×17 sampling points in total.

Figure 6:
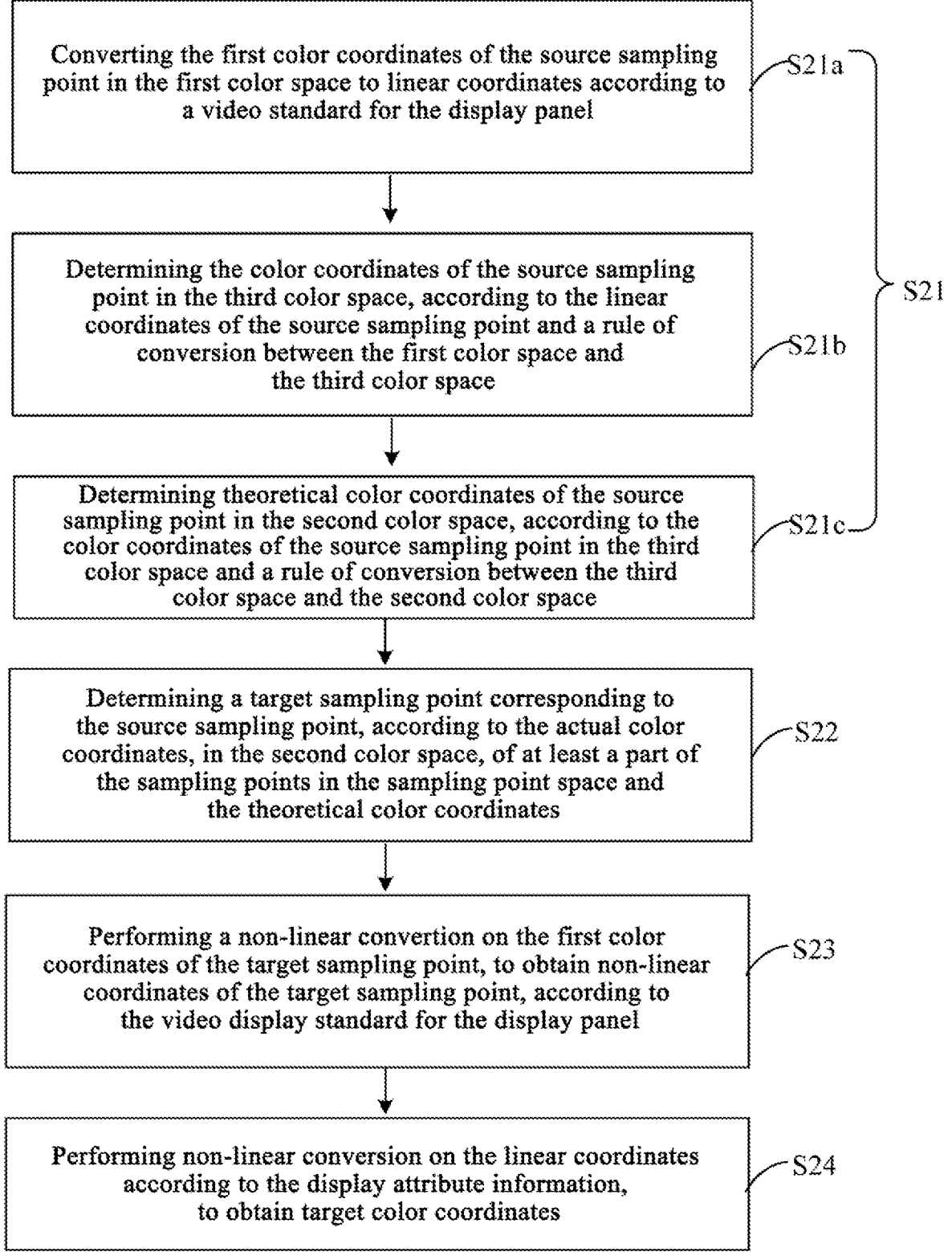
FIG. 6 is a schematic diagram illustrating steps of a preset processing provided in other embodiments of the present disclosure.

FIG. 6 is a flow chart illustrating steps of a preset processing provided in other embodiments of the present disclosure, where FIG. 6 illustrates a specific embodiment of the method in FIG. 4. As shown in FIG. 6, the preset processing on each sampling point includes the following steps S21 to S24.

Step S21, taking the sampling point as a source sampling point, and determining theoretical color coordinates of the source sampling point in a second color space according to a standard rule of conversion between the first color space and the second color space.

In some embodiments, the determining the theoretical color coordinates of the source sampling point in the second color space according to a standard rule of conversion between the first color space and the second color space may specifically include steps S21a to S21c.

Step S21a, converting the first color coordinates of the source sampling point in the first color space to linear coordinates according to a video standard for the display panel.

For example, each video display standard corresponds to a rule of a non-linear conversion, which rule is used for converting the first color coordinates in a first color space to linear coordinates.

The video display standards selectable for the display panel may include BT2020, BT709, DCIP3, BT2100-HLG and BT2100-PQ.

For BT2020 and BT709, the rule of non-linear conversions for both are shown as the following formula (1-1):

$$E = \frac{E'}{4.500} \qquad 0 \le E' < 0.081 \qquad (1-1)$$

$$E = \left(\frac{E' + 0.099}{1.099}\right)^{\frac{1}{0.45}} \qquad 0.081 \le E' \le 1$$

For DCI-P3, the rule of non-linear conversion is shown as the following formula (1-2):

$$E = E'^{2.6}. \qquad (1-2)$$

For BT2100-HLG, the rule of non-linear conversion is shown as the following formula (1-3):

$$E = \frac{E'^2}{3}, \qquad 0 \le E' \le 1/2 \qquad (1-3)$$

$$E = \frac{e^{\frac{E'-c}{a}} + b}{12}, \qquad 1/2 < E' \le 1$$

$$a = 0.17883277, \quad b = 1 - 4a, c = 0.5 - a \ln(4a)$$

For BT2100-PQ, the rule of non-linear conversion is shown in the following formula (1-4):

$$Y = \left(\frac{\max\left[(E'^{1/m2} - c1), 0\right]}{c2 - c3E'^{1/m2}}\right)^{1/m1} \qquad (1-4)$$

$$m1 = 2610/16384$$

$$m2 = 2523/4096 \times 128$$

$$c1 = 3424/4096 = c3 - c2 + 1$$

$$c2 = 2413/4096 \times 32$$

$$c3 = 2392/4096 \times 32$$

In the above formulas of the rule of non-linear conversions, E' represents non-linear coordinates, i.e., first color coordinates of the sampling point in the first color space, and E represents linear coordinates.

Step S21b, determining the color coordinates of the source sampling point in the third color space, according to the linear coordinates of the source sampling point and a rule of conversion between the first color space and the third color space.

In some embodiments, the third color space is XYZ space. The rule of conversion between the first color space and the third color space is expressed by the following formula (2-1):

$$\begin{pmatrix} X \\ Y \\ Z \end{pmatrix} = \begin{pmatrix} x_r & x_g & x_b \\ y_r & y_g & y_b \\ z_r & z_g & z_b \end{pmatrix}\begin{pmatrix} r \cdot (X + Y + Z)_r \\ g \cdot (X + Y + Z)_g \\ b \cdot (X + Y + Z)_b \end{pmatrix} \qquad (2-1)$$

$$= \begin{pmatrix} x_r & x_g & x_b \\ y_r & y_g & y_b \\ z_r & z_g & z_b \end{pmatrix}\begin{pmatrix} (X + Y + Z)_r & 0 & 0 \\ 0 & (X + Y + Z)_g & 0 \\ 0 & 0 & (X + Y + Z)_b \end{pmatrix}\begin{pmatrix} r \\ g \\ b \end{pmatrix}.$$

The linear coordinates of the sample pixel are (r, g, b), and the values of r, g, b determine a proportional relationship among the three primary colors. The color coordinate of the source sampling point in the third color space is (X, Y, Z). In formula (2-1), $$\begin{pmatrix} x_r & x_g & x_b \\ y_r & y_g & y_b \\ z_r & z_g & z_b \end{pmatrix}$$

is the color coordinates of the three primary colors defined in the different video display standards, and values of the three primary colors are shown in table 1 below:

TABLE 1

|  | BT.709 | | DCI-P3 | | BT.2020 | |
|---|---|---|---|---|---|---|
|  | x | y | x | y | x | y |
| R | 0.640 | 0.330 | 0.680 | 0.320 | 0.708 | 0.292 |
| G | 0.300 | 0.600 | 0.265 | 0.690 | 0.170 | 0.797 |
| B | 0.150 | 0.060 | 0.150 | 0.060 | 0.131 | 0.046 |
| W | 0.3127 | 0.3290 | 0.314 | 0.351 | 0.3127 | 0.3290 |

In addition, in the formula (2-1), $$\begin{pmatrix} (X + Y + Z)_r \\ (X + Y + Z)_g \\ (X + Y + Z)_b \end{pmatrix} = \begin{pmatrix} x_r & x_g & x_b \\ y_r & y_g & y_b \\ z_r & z_g & z_b \end{pmatrix}^{-1}\begin{pmatrix} X \\ Y \\ Z \end{pmatrix}_{D65}, \text{ where } \begin{pmatrix} X \\ Y \\ Z \end{pmatrix}_{D65}$$

represents the tristimulus values of the white point.

Step S21c, determining theoretical color coordinates of the source sampling point in the second color space, according to the color coordinates of the source sampling point in the third color space and a rule of conversion between the third color space and the second color space.

The third color space is XYZ space, the second color space is LAB space, and the rule of conversion between two is referred to the above formula (0-1) and formula (0-2). According to the formula (0-1) and the formula (0-2), the color coordinates of the source sampling point in the second color space can be determined, and the color coordinates can be taken as the theoretical color coordinates.

Step S22, determining a target sampling point corresponding to the source sampling point, according to the actual color coordinates, in the second color space, of at least a part of the sampling points in the sampling point space and the theoretical color coordinates. The actual color coordinates of each sampling point in the second color space are determined according to at least the display attribute information of the display panel and the first color coordinates of the sampling points.

The non-linear first color coordinates of the sampling point in the first color space can be converted to the linear coordinates according to the above rule of non-linear conversion; then the actual color coordinates of the sampling point in the third color space are determined according to the mapping relationship between the input color and the output color of the display panel obtained in step S01; and then, the actual color coordinates of the sampling point in the second color space are determined according to the rule of conversion between the third color space and the second color space.

Figure 7:
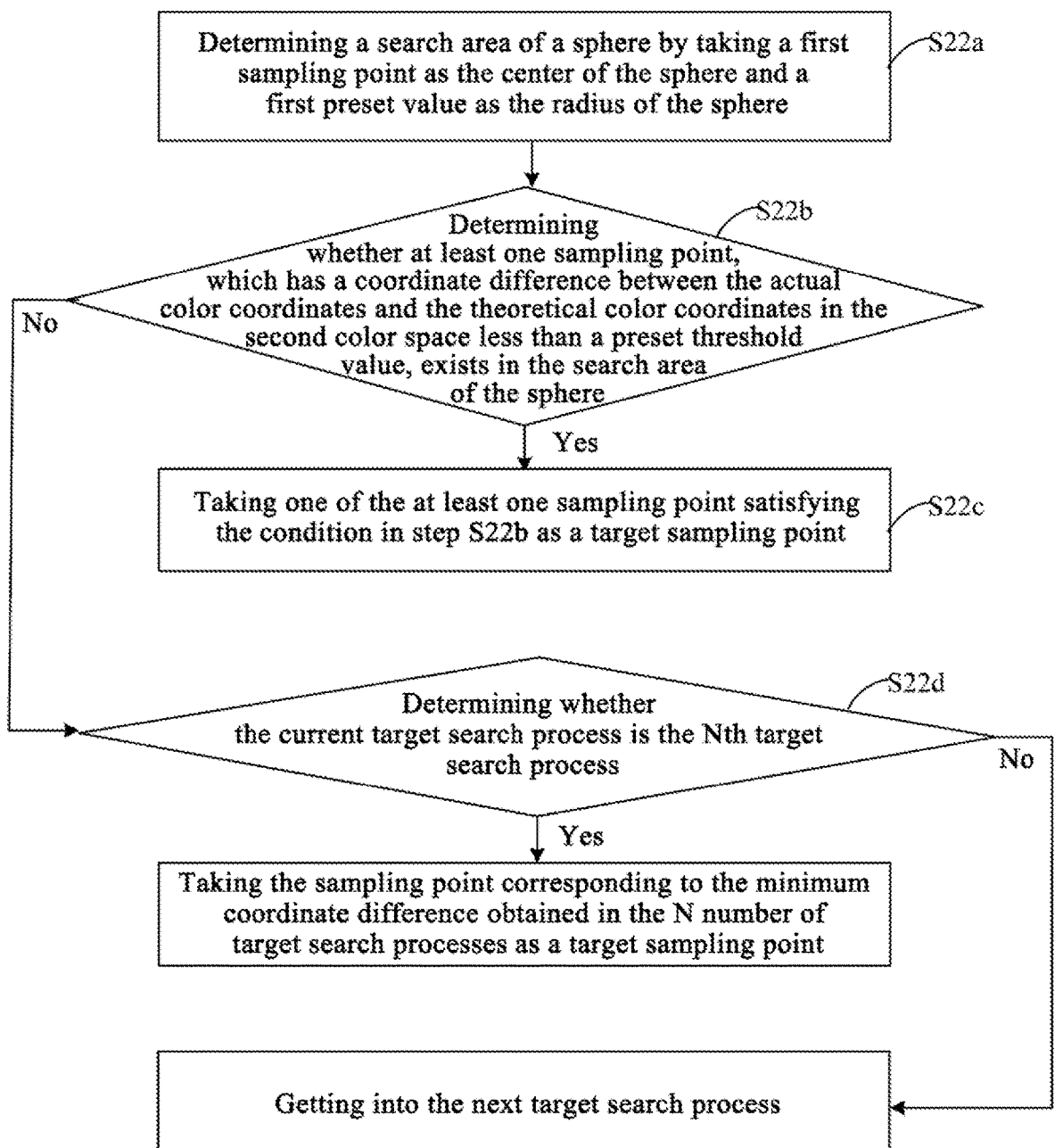
FIG. 7 is a flow chart illustrating a target search process provided in some embodiments of the present disclosure.

In some embodiments, step S022 may include at least one target search process. FIG. 7 is a flow chart illustrating a target search process provided in some embodiments of the present disclosure. As shown in FIG. 7, each target search process includes the following steps:

Step S22a, determining a search area of a sphere by taking a first sampling point as the center of the sphere and a first preset value as the radius of the sphere.

For a color with same color coordinates, a difference between the RGB coordinate values in the color gamuts of different video standards is not too large, and the first preset value may be determined according to the difference between the RGB coordinate values of the color with the same color coordinates in different color gamuts. In some embodiments, the difference between RGB coordinates of the color with the same color coordinates in different color gamuts does not exceed a first preset value. In one example, the first preset value is less than or equal to 0.35×Max, where Max is a maximum value of the coordinate value of each dimension in the first color coordinates. For example, if the color displayed on the display panel is of 8 bits, the first preset value is less than or equal to 0.35×255.

Step S22b, determining whether at least one sampling point, which has a coordinate difference between the actual color coordinates and the theoretical color coordinates in the second color space less than a preset threshold value, exists in the search area of the sphere. If so, perform step S22c. Otherwise, perform step S22d.

If the actual color coordinates of a certain sampling point in the second color space are marked as $(L_1, a_1, b_1)$ and the theoretical color coordinates are marked as $(L_2, a_2, b_2)$, then the coordinate difference between the two is calculated according to the following formula (3-1).

$$\Delta E_{ab}^* = \left[ (\Delta L^*)^2 + (\Delta a^*)^2 + (\Delta b^*)^2 \right]^{1/2}, \qquad (3\text{-}1)$$

$$\text{wherein} \begin{cases} \Delta L^* = L_2^* - L_1^* \\ \Delta a^* = a_2^* - a_1^* \\ \Delta b^* = b_2^* - b_1^* \end{cases}.$$

$$\Delta E_{ab}^*$$

is also a quantitative index for evaluating a closeness between the colors represented by two coordinate points in the LAB space. When $$\Delta E_{ab}^*$$

is greater than 1.5, the two colors can be distinguished by naked eyes. Therefore, in some embodiments of the present disclosure, the preset threshold is set to a value less than or equal to 1.5, so that the finally generated color mapping table can reproduce more accurate colors when used in color correction. For example, the preset threshold is equal to 1.5.

Step S22c, taking one of the at least one sampling point satisfying the condition in step S22b as a target sampling point.

In some embodiments, when it is determined in step S22b that one sampling point in the search area of the sphere satisfies the condition (i.e., when the coordinate difference between the actual color coordinates of one sampling point in the second color space and the theoretical color coordinates is less than the preset threshold), the sampling point is taken as the target sampling point. When it is determined in step S22b that all of the plurality of (e.g., M number of) sampling points satisfy the condition, a minimum coordinate difference is selected from the M number of coordinate differences corresponding to the M sampling points, and the sampling point corresponding to the minimum coordinate difference is taken as the target sampling point.

Step S22d, determining whether the current target search process is the Nth target search process. If so, take the sampling point corresponding to the minimum coordinate difference obtained in the N number of target search processes as a target sampling point; if not, get into the next target search process.

N is a preset integer greater than 1. The first sampling point in the first target search process is the source sampling point. In each target search process subsequent to the first target search process, the first sampling point is the sampling point corresponding to the minimum coordinate difference obtained in the previous target search process.

The process of step S22 will be described below with reference to a specific example. In one example, N is 3. The RGB coordinates of the source sampling point are (0, 0, 32). That is, the coordinates of the source sampling point in the sampling point space are also (0, 0, 32). Firstly, a first search area of the sphere is determined by taking the source sampling point as the center of the sphere and a first preset value as the radius of the sphere. For the source sampling point, RGB coordinates of the source sampling point are converted to linear coordinates according to the rule of the non-linear conversion, then the linear coordinates are converted to theoretical XYZ coordinates according to the formula (2-1), and then the theoretical XYZ coordinates are converted to LAB coordinates, and the LAB coordinates are recorded as theoretical LAB coordinates, namely theoretical color coordinates. For each sampling point in the first search area of the sphere, the RGB coordinates of the sampling point are converted to linear coordinates according to the above rule of the non-linear conversion, then the display XYZ coordinates of each sampling point are looked up according to the mapping relationship between the input and the output of the display panel obtained in the above step S01 (the mapping relationship between the linear RGB coordinates and the XYZ coordinates), and then the display XYZ coordinates are converted to LAB coordinates, which are recorded as actual LAB coordinates, namely actual color coordinates. Assuming that in the first search area of the sphere, a coordinate difference ΔE between the actual LAB coordinates of a sampling point with coordinates (0, 0, 16) and the theoretical LAB coordinates of the source sampling point is less than a preset threshold, the sampling point with coordinates (0, 0, 16) is taken as the target sampling point. Assuming that in the first search area of the sphere, the coordinate difference ΔE between the actual LAB coordinates of any one sampling point and the theoretical LAB coordinates of the source sampling point is greater than the preset threshold value, and compared with ΔE corresponding to other sampling points, ΔE corresponding to the sampling point with the coordinate of (0, 0, 16) is the minimum, then a second search area of a sphere is determined by taking (0, 0, 16) as the center of the sphere and taking the first preset value as the radius of the sphere, to perform a second search. Assuming that one sampling point exists in the second search area of the sphere and the coordinate difference ΔE between the actual LAB coordinates of the sampling point and the theoretical LAB coordinates of the source sampling point is less than the preset threshold value, then the sampling point is determined as the target sampling point. Assuming that ΔE of each sampling point in the second search area of the sphere is greater than the preset threshold, then a third search area of a sphere is determined and a third search is performed. If ΔE of any one sampling point in the third search area of the sphere is greater than the preset threshold value, then the minimum ΔE is selected from all the ΔEs obtained during the third search, and the sampling point corresponding to the minimum ΔE is taken as the target sampling point.

With continued reference to FIG. 6, after the target sampling point is determined, continue the following steps S23 and S24.

Step S23, performing a non-linear conversion on the first color coordinates of the target sampling point, to obtain non-linear coordinates of the target sampling point, according to the video display standard for the display panel.

The first color coordinates of the target sampling point are non-linear coordinates, and the non-linear coordinates may be converted to linear coordinates according to the rule of the non-linear conversion in the foregoing paragraphs.

Step S24, performing non-linear conversion on the linear coordinates according to the display attribute information, to obtain target color coordinates.

In step S24, the linear coordinates of the target sampling point is converted to non-linear coordinates according to the gamma curve of the display panel, and the non-linear coordinates are taken as the target color coordinates.

For example, the linear coordinates of the target sampling point are marked as (r, g, b), the target color coordinates are marked as (r', g', b'), and the gamma curve of the display panel is marked as $$y_{output} = x_{input}^{\gamma},$$

then r'=r$^{1/\gamma}$; g'=g$^{1/\gamma}$; b'=b$^{1/\gamma}$.

FIG. 8 is a schematic diagram illustrating a method of correcting color provided in some embodiments of the present disclosure. As shown in FIG. 8, the method of correcting color includes the following steps S100 to S400.

Step S100, converting original color data of a pixel to first color coordinates in a first color space, in response to the original color data.

In step S100, the pixel belongs to a specific target image, or the pixel belongs to a target frame in a specific target video. In some embodiments, color correction is performed on each pixel in the target image or the target frame.

Step S200, mapping the first color coordinates of the original color data into a sampling point space, to obtain a mapping point corresponding to the first color coordinates of the original color data in the sampling point space, and determining the first color coordinates of a plurality of reference points corresponding to the mapping coordinates of the mapping point in the first color space, according to the mapping coordinates.

The first color coordinates of the original color data is mapped into the sampling point space. That is, coordinate value of each dimension in the first color coordinates is mapping independently, where a mapping point corresponding to a single first color coordinate is unique; and a single mapping point corresponds to a plurality of reference points. Subsequently, correction is performed based on an interpolation algorithm.

The reference point is a sampling point in the sampling point space, and the first color coordinates of the reference point in the first color space is consistent with the coordinates of the reference point in the sampling point space.

Step S300, determining the target color coordinates of each reference point, according to the first color coordinates of the reference point and the color mapping table.

The color mapping table is generated using the method for generating a color mapping table in the above embodiment. The first color coordinates and the target color coordinates, in the first color space, of each sampling point in the sampling point space are recorded in the color mapping table.

Step S400, acquiring corrected color data of the pixel through an interpolation algorithm, according to the target color coordinates of all the reference points.

As described above, the sampling point space includes a plurality of sampling cubes, each of the plurality of sampling cubes is defined by eight sampling points as vertices of the sampling cube. In addition, the sampling cube may be divided into a plurality of tetrahedrons. FIG. 9 is a schematic diagram illustrating a sampling cube divided into a plurality of tetrahedrons provided in some embodiments of the present disclosure. As shown in FIG. 9, eight vertices of the sampling cube are p0 to p7, respectively, and the sampling cube is divided into 6 tetrahedrons, and each tetrahedron is defined by four vertices of the sampling cube.

In some embodiments, in step S200, determining the first color coordinates of a plurality of reference points corresponding to the mapping coordinates in the first color space, according to the mapping coordinates of the mapping point, includes the following steps S201 to S202.

Step S201, determining a tetrahedron where the mapping point is located, and taking each vertex of the tetrahedron as the reference point.

Step S202, taking the coordinates of the reference point in the sampling point space as the first color coordinates of the reference point.

In some embodiments, the above step S400 may specifically include: acquiring the corrected color data of the pixel according to the following formula:

$$\hat{f}(p) = [f(p_0) f(p_1) f(p_2) f(p_3)] \begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix}^{-1} \begin{bmatrix} x \\ y \\ z \\ 1 \end{bmatrix}. \tag{4}$$

Where p represents the mapping point, and $p_0$, $p_1$, $p_2$ and $p_3$ represent the vertices of the tetrahedron where the mapping point is located; f(p) is the corrected color data; $f(p_0)$, $f(p_1)$, $f(p_2)$, and $f(p_3)$ are the target color coordinates of the four vertices of the tetrahedron, respectively; $(x_0, y_0, z_0)$ are coordinates of the vertex $p_0$ with respect to a datum point; $(x_1, y_1, z_1)$ are coordinates of the vertex $p_1$ with respect to the datum point, $(x_2, y_2, z_2)$ are coordinates of the vertex $p_2$ with respect to the datum point, $(x_3, y_3, z_3)$ are coordinates of the vertex $p_3$ with respect to the datum point; and (x, y, z) are coordinates of the first mapping point with respect to the datum point.

The datum point is one of the vertices of the sampling cube where the mapping point is located. It can be understood that the three coordinate axes of the sampling point space are used to represent the R value, G value and B value of the sampling point, respectively. The coordinates of each vertex of the tetrahedron in the sampling point space are consistent with the corresponding first color coordinates of the vertex in the first color space. Therefore, $x_0$ is a difference between the R value of the vertex $p_0$ and the R value of the datum point; $y_0$ is a difference between the G value of the vertex $p_0$ and the G value of the datum point, $z_0$ is a difference between the B value of the vertex $p_0$ and the B value of the datum point. Similarly, $x_1$ is a difference between the R value of the vertex $p_1$ and the R value of the datum point; $y_1$ is a difference between the G value of the vertex $p_1$ and the G value of the datum point, $z_1$ is a difference between the B value of the vertex $p_1$ and the B value of the datum point. $x_2$ is a difference between the R value of the vertex $p_2$ and the R value of the datum point; $y_2$ is a difference between the G value of the vertex $p_2$ and the G value of the datum point, $z_2$ is a difference between the B value of the vertex $p_2$ and the B value of the datum point. $x_3$ is a difference between the R value of the vertex $p_3$ and the R value of the datum point; $y_3$ is a difference between the G value of the vertex $p_3$ and the G value of the datum point, $z_3$ is a difference between the B value of the vertex $p_3$ and the B value of the datum point. x is a difference between the R value of the vertex p and the R value of the datum point; y is a difference between the G value of the vertex p and the G value of the datum point, z is a difference between the B value of the vertex p and the B value of the datum point.

Figure 10:
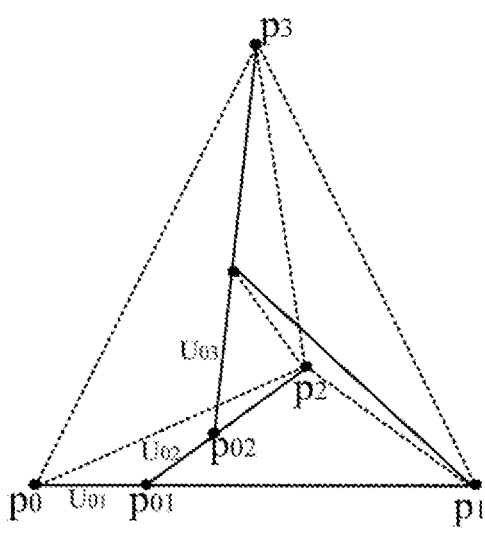
FIG. 10 is a schematic diagram illustrating a mapping point p in a tetrahedron.

The derivation process of formula (4) is as follows:

FIG. 10 is a schematic diagram illustrating a mapping point p in a tetrahedron. As shown in FIG. 10, an extension line of a connection line between the mapping point p and the vertex $p_3$ intersects a plane where $p_0$, $p_1$ and $p_2$ are located at a point $p_{02}$, an extension line of a connection line between the vertex $p_2$ and the intersection point $p_{02}$ intersects a connection line between $p_0$ and $p_1$ at a point $p_{01}$, and a ratio of a length a connection line between the points $p_{01}$ and $p_{02}$ to a length of a connection line between $p_{01}$ and $p_2$ is $U_{02}$; a ratio of a length of a connection line between $p_0$ and $p_{01}$ to a length of a connection line between $p_0$ and $p_1$ is $U_{01}$; a ratio of a length of a connection line between the mapping point p and the point $p_{02}$ to a length of a connection line between the points $p_{02}$ and $p_3$ is $U_{03}$.

Where $$\hat{f}(p) = f(p_0)(1 - u_{03})(1 - u_{02})(1 - u_{01}) + \qquad (4\text{-}1)$$
$$f(p_1)(1 - u_{03})(1 - u_{02})u_{01} + f(p_2)(1 - u_{03})u_{02} + f(p_3)u_{03}$$

It can be obtained from formula (3-1) that:

$$\hat{f}(p) = \sum_{i=0}^{3} w_i f(p_i), \qquad (4\text{-}2)$$

where $w_i$ represents a combination coefficient, $$\sum_{i=0}^{3} w_i = 1.$$

It can be further obtained that:

$$\hat{f}(p) = \sum_{i=0}^{3} \frac{V_i}{V} f(p_i), \qquad (4\text{-}3)$$

$$\text{where } \sum_{i=0}^{3} \frac{V_i}{V} = 1,$$

V is a volume of a tetrahedron defined by $p_0$, $p_1$, $p_2$ and $p_3$, and $V_0$ is a volume of a tetrahedron defined by p, $p_1$, $p_2$ and $p_3$; $V_1$ is a volume of a tetrahedron defined by p, $p_0$, $p_2$ and $p_3$; $V_2$ is a volume of a tetrahedron defined by p, $p_0$, $p_1$ and $p_3$; and $V_3$ is a volume of a tetrahedron defined by p, $p_0$, $p_1$ and $p_2$.

According to the above formulas (4-1) to (4-3) and FIG. 10, the first mapping point is converted into a linear combination of endpoints, coefficients of the linear combination accord with a relationship between volume ratios, and the calculation process of the linear combination coefficient satisfies the following linear simultaneous equations:

$$\begin{bmatrix} x \\ y \\ z \\ 1 \end{bmatrix} = \begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix} \begin{bmatrix} w_0 \\ w_1 \\ w_2 \\ w_3 \end{bmatrix}$$

According to cramer rule, each combination coefficient $w_i$ can be found as follows:

$$w_0 = \frac{\begin{vmatrix} x & x_1 & x_2 & x_3 \\ y & y_1 & y_2 & y_3 \\ z & z_1 & z_2 & z_3 \\ 1 & 1 & 1 & 1 \end{vmatrix}}{\Delta} \quad w_1 = \frac{\begin{vmatrix} x_0 & x & x_2 & x_3 \\ y_0 & y & y_2 & y_3 \\ z_0 & z & z_2 & z_3 \\ 1 & 1 & 1 & 1 \end{vmatrix}}{\Delta}$$

$$w_2 = \frac{\begin{vmatrix} x_0 & x_1 & x & x_3 \\ y_0 & y_1 & y & y_3 \\ z_0 & z_1 & z & z_3 \\ 1 & 1 & 1 & 1 \end{vmatrix}}{\Delta} \quad w_3 = \frac{\begin{vmatrix} x_0 & x_1 & x_2 & x \\ y_0 & y_1 & y_2 & y \\ z_0 & z_1 & z_2 & z \\ 1 & 1 & 1 & 1 \end{vmatrix}}{\Delta}$$

$$\Delta = \begin{vmatrix} x_0 & x_1 & x_2 & x_3 \\ y_0 & y_1 & y_2 & y_3 \\ z_0 & z_1 & z_2 & z_3 \\ 1 & 1 & 1 & 1 \end{vmatrix}.$$

Hence, the above formula (3) can be derived.

Compared with a cubic linear interpolation algorithm, the above interpolation method in the present disclosure is simple in operation and can obtain the target color coordinates more accurately and rapidly.

Figure 11:
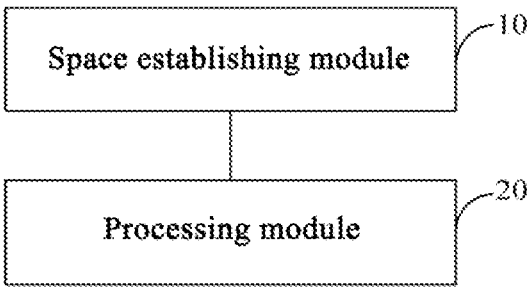
FIG. 11 is a schematic diagram illustrating an apparatus for generating a color mapping table provided in some embodiments of the present disclosure.

An embodiment of the present disclosure further provides an apparatus for generating a color mapping table, where the color mapping table is used to perform color correction on a display panel. FIG. 11 is a schematic diagram illustrating an apparatus for generating a color mapping table provided in some embodiments of the present disclosure. As shown in FIG. 11, the apparatus for generating a color mapping table includes: a space establishing module 10 and a processing module 20.

The space establishing module 10 is configured to establish a sampling point space according to first color coordinates of a plurality of sampling points in a first color space.

The processing module 20 is configured to perform steps of a preset processing on each sampling point, to acquire target color coordinates of each sampling point in the first color space, and generate a color mapping table according to the first color coordinates and the target color coordinates of the plurality of sampling points. The steps of the preset processing on each sampling point include the following steps: taking the sampling point as a source sampling point, and determining a target sampling point corresponding to the source sampling point; and processing the target sampling point to obtain the target color coordinates.

In some embodiments, taking the sampling point as a source sampling point, and determining a target sampling point corresponding to the source sampling point, includes: determining theoretical color coordinates of the source sampling point in a second color space according to a rule of the standard conversion between the first color space and the second color space, where the second color space is a perceptually uniform color space; determining a target sampling point corresponding to the source sampling point according to the actual color coordinates of at least a part of the sampling points in the sampling point space in the second color space and the theoretical color coordinates, where the actual color coordinates of each sampling point in the second color space are determined according to at least the display attribute information of the display panel and the first color coordinates of the sampling point. Processing the target sampling point to obtain the target color coordinates may specifically include: performing non-linear conversion on the first color coordinates of the target sampling point, according to the video display standard for the display panel, to obtain linear coordinates of the target sampling point; and performing non-linear conversion on the linear coordinates according to the display attribute information, to obtain the target color coordinates.

In some embodiments, when the processing module 20 acquires the target sampling point corresponding to the source sampling point, the processing module may acquire the target sampling point through at least one target search process. The target search process specifically refers to the above description, which is not repeated herein.

In some embodiments, the first color space is RGB space, and the second color space is LAB space.

In some embodiments, the apparatus for generating a mapping table further includes a testing module configured to acquire display attribute information of the display panel. The display attribute information includes a mapping relationship between input colors and output colors of the display panel and a gamma curve of the display panel. The mapping relationship represents a relationship between third color coordinates of the actually displayed color in a third color space and the linear coordinates of the test color data when the display panel displays in response to test color data, where the linear coordinates of the test color data is obtained by performing a non-linear conversion on the first color coordinates of the test color data in the first color space according to a gamma curve. Third color space is the XYZ space.

Figure 12:
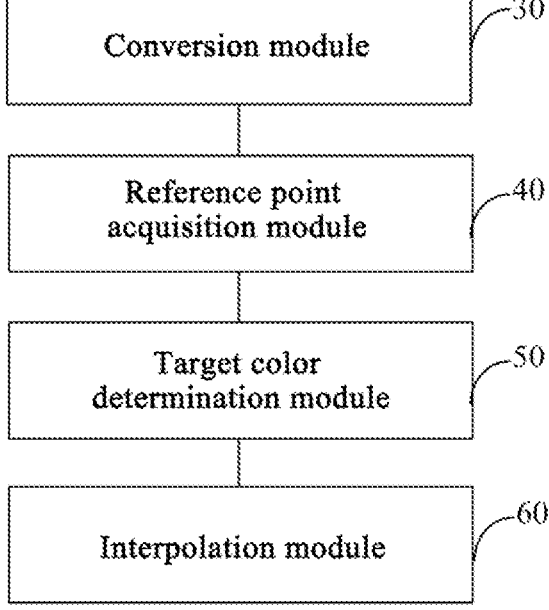
FIG. 12 is a schematic diagram illustrating an apparatus for correcting color provided in some embodiments of the present disclosure.

FIG. 12 is a schematic diagram illustrating an apparatus for correcting color provided in some embodiments of the present disclosure. As shown in FIG. 12, the apparatus for correcting color includes a conversion module 30, a reference point acquisition module 40, a target color determination module 50 and an interpolation module 60.

The conversion module 30 is configured to convert, in response to original color data of a pixel, the original color data to first color coordinates in a first color space.

The reference point acquisition module 40 is configured to map the first color coordinates of the original color data into a sampling point space, to obtain a mapping point corresponding to the first color coordinates of the original color data in the sampling point space, and determine a plurality of reference points corresponding to mapping coordinates of the mapping point, according to the mapping coordinates of the mapping point.

The target color determination module 50 is configured to determine target color coordinates of each of the reference points according to the color mapping table. The color mapping table is generated by the above apparatus for generating a color mapping table, and the color mapping table may be acquired in advance and stored in the apparatus for correcting color.

The interpolation module 60 is configured to acquire corrected color data of the pixel through an interpolation algorithm, according to the target color coordinates of each of the reference points.

The process of acquiring the corrected color data through the interpolation algorithm is described above, and is not repeated herein.

The apparatus for correcting color may be a Field Programmable Gate Array (FPGA for short).

Figure 13:
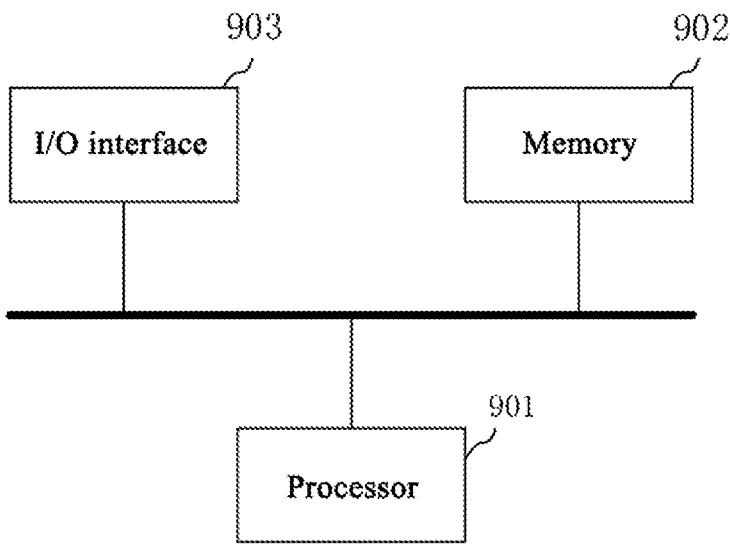
FIG. 13 is a schematic diagram illustrating a display device provided in some embodiments of the present disclosure.

FIG. 13 is a schematic diagram illustrating a display device provided in some embodiments of the present disclosure. As shown in FIG. 13, the display device includes:

one or more processors 901;

a memory 902 storing one or more programs which, when executed by the one or more processor, cause the one or more processor to perform the method of generating a color mapping table or the method of correcting color in the above embodiment; and one or more I/O interfaces 903 coupled between the processor and the memory and configured to enable information interaction between the processor and the memory.

The processor 901 is a device with data processing capability, which includes but is not limited to a central processing unit (CPU), or the like. The memory 902 is a device having data storage capabilities including, but not limited to, random access memory (RAM, more specifically SDRAM, DDR, etc.), read only memory (ROM), electrically erasable programmable read only memory (EEPROM), flash memory (FLASH). The I/O interface (read/write interface) 903 coupled between the processor 901 and the memory 902 may enable information interaction between the processor 901 and the memory 902, which may include, but is not limited to, a data bus (Bus), or the like.

In some embodiments, the display device further includes a display panel to which original color data corresponding to an image and a video is transmitted after being corrected. The display device may be a monitor, in which a conversion of an input original screen color gamut to a target color gamut may be achieved by color correction.

In some embodiments, the processor 901, the memory 902, and the I/O interface 903 are connected to each other through a bus, and in turn to other components of the computing device.

The present embodiment further provide a computer readable medium storing a computer program which, when executed by a processor, cause the processor to perform the method of generating a color mapping table or the method of correcting color in the above embodiment, and in order to avoid a repeated description, specific steps of the method are not described herein again.

It will be understood by one of ordinary skill in the art that all or some of the steps of the methods, function modules/units in the systems or apparatus disclosed above may be implemented as software, firmware, hardware, or suitable combinations thereof. In a hardware implementation, a division between the function modules/units mentioned in the above description does not necessarily correspond to a division of physical components. For example, one physical component may have a plurality of functions, or one function or step may be performed by several physical components in cooperation.

Some or all of the physical components may be implemented as software executed by a processor, such as a central processing unit, digital signal processor, or microprocessor, or as hardware, or as an integrated circuit, such as an application specific integrated circuit. Such software may be distributed on a computer readable medium, which may include a computer storage medium (a non-transitory medium) and a communication medium (a transitory medium). As is well known to one of ordinary skill in the art, the term "computer storage medium" includes volatile and nonvolatile, removable and non-removable media implemented in any method or technology for storage of information (such as computer readable commands, data structures, program modules or other data). The computer storage medium includes, but is not limited to, RAM, ROM, EPROM, flash memory or other memory technologies, CD-ROM, digital versatile disc (DVD) or other optical disk storage, magnetic cassette, magnetic tape, magnetic disk storage or other magnetic storage apparatuses, or any other medium which can be used to store the desired information and can be accessed by a computer. In addition, as is well known to one of ordinary skill in the art, the communication medium typically contains computer readable commands, data structures, program modules or other data in a modulated data signal such as a carrier wave or other transport mechanism, and includes any information delivery medium.

It should be noted that, in the present disclosure, the terms "comprise", "include", or any other variation thereof, are intended to encompass a non-exclusive inclusion, such that a process, method, article, or apparatus that comprises a list of elements includes not only those elements but also other elements not expressly listed or inherent to such process, method, article, or apparatus. Without further limitation, an element defined by the phrase "comprising a/an . . . " does not exclude the presence of additional identical elements in the process, method, article, or apparatus that comprises the element.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A method of generating a color mapping table for correcting color of a display panel, comprising:

establishing a sampling point space, according to first color coordinates of a plurality of sampling points in a first color space; and performing steps of a preset processing on each of the plurality of sampling points, to obtain target color coordinates of the sampling point in the first color space, and generating the color mapping table according to the first color coordinates and target color coordinates of the plurality of sampling points, wherein the steps of the preset processing on each of the plurality of sampling points comprise:

taking the sampling point as a source sampling point, and determining a target sampling point corresponding to the source sampling point, wherein the taking the sampling point as a source sampling point, and determining a target sampling point corresponding to the source sampling point, comprises:

taking the sampling point as the source sampling point, and determining theoretical color coordinates of the source sampling point in a second color space, according to a rule of a standard conversion between the first color space and the second color space; and determining the target sampling point corresponding to the source sampling point, according to actual color coordinates, in the second color space, of at least a part of the plurality of sampling points in the sampling point space and the theoretical color coordinates, wherein the determining the target sampling point corresponding to the source sampling point, according to actual color coordinates, in the second color space, of at least a part of the plurality of sampling points in the sampling point space and the theoretical color coordinates, comprises: performing at least one target search process, wherein each of the at least one target search process comprises:

determining a search area of a sphere, by taking a first sampling point as a center of the sphere and a first preset value as a radius of the sphere;

if a coordinate difference between the actual color coordinates, in the second color space, of at least one sampling point in the search area of the sphere and the theoretical color coordinates is less than a preset threshold value, taking one of the at least one sampling point as the target sampling point; and otherwise, determining whether a current target search process is in an Nth target search process, if so, taking the sampling point corresponding to a minimum coordinate difference obtained in previous N target search processes as the target sampling point; if not, getting into a next target search process, wherein N is a preset integer greater than 1; the first sampling point in a first target search process is the source sampling point; in each target search process subsequent to the first target search process, the first sampling point is the sampling point corresponding to the minimum coordinate difference obtained in a previous target search process, wherein the actual color coordinates of the sampling point in the second color space are determined according to at least display attribute information of the display panel and the first color coordinates of the sampling point; and processing the target sampling point, to obtain the target color coordinates, wherein the processing the target sampling point, to obtain the target color coordinates, comprises:

performing a non-linear conversion on the first color coordinates of the target sampling point, according to video display standard in the display panel, to obtain linear coordinates of the target sampling point; and performing non-linear conversion on the linear coordinates according to the display attribute information, to obtain the target color coordinates.

2. The method according to claim 1, wherein the taking one of the at least one sampling point as the target sampling point, comprises:

taking the sampling point corresponding to the minimum coordinate difference in the at least one sampling point as the target sampling point.

3. The method according to claim 2, wherein the first preset value is greater than or equal to a difference between RGB coordinates of a color of same color coordinates in different color gamuts.

4. The method according to claim 1, wherein prior to the performing steps of a preset processing on each of the plurality of sampling points, the method further comprises:

acquiring display attribute information of the display panel, wherein the display attribute information comprises a mapping relationship between input colors and output colors of the display panel and a gamma curve of the display panel, wherein the mapping relationship represents a relationship between third color coordinates of actually displayed color in a third color space and linear coordinates of test color data, when the display panel displays in response to the test color data, and the linear coordinates of the test color data are obtained by performing a non-linear conversion on the first color coordinates of the test color data in the first color space according to the gamma curve.

5. The method according to claim 4, wherein the first color space is a RGB space, the second color space is a LAB space, and the third color space is an XYZ space.

6. The method according to claim 1, wherein the establishing a sampling point space, according to first color coordinates of a plurality of sampling points in a first color space, comprises:

establishing a three-dimensional coordinate system, wherein the three-dimensional coordinate system comprises a first coordinate axis extending along a first direction, a second coordinate axis extending along a second direction, and a third coordinate axis extending along a third direction; and setting multiple sampling points at equal intervals in the sampling point space along each of the first direction, the second direction and the third direction, according to a preset number of the sampling points, wherein every eight adjacent sampling points form a sampling cube with the eight adjacent sampling points being vertices of the sampling cube, and all the sampling cubes form the sampling point space, wherein the coordinates of the sampling points in the sampling point space coincide with the first color coordinates of the sampling points.

7. The method according to claim 1, wherein the taking the sampling point as the source sampling point, and determining theoretical color coordinates of the source sampling point in a second color space, according to a rule of a standard conversion between the first color space and the second color space, comprises:

converting the first color coordinates of the source sampling point in the first color space to the linear coordinates, according to a video display standard for the display panel;

determining color coordinates of the source sampling point in a third color space, according to the linear coordinates and a rule of a conversion between the first color space and the third color space; and determining the theoretical color coordinates of the source sampling point in the second color space, according to the color coordinates of the source sampling point in the third color space and a rule of a conversion between the third color space and the second color space.

8. A method of correcting color, comprising:

in response to original color data of a pixel, converting the original color data to first color coordinates in a first color space;

mapping the first color coordinates of the original color data into a sampling point space, to obtain a mapping point corresponding to the first color coordinates of the original color data in the sampling point space, and determining the first color coordinates of a plurality of reference points corresponding to mapping coordinates of the mapping point in the first color space, according to the mapping coordinates of the mapping point, wherein the sampling point space comprises a plurality of sampling cubes, each of the plurality of sampling cubes is defined by eight sampling points as vertices of the sampling cube, and the sampling cube is divided into a plurality of tetrahedrons; and the determining the first color coordinates of a plurality of reference points corresponding to mapping coordinates of the mapping point in the first color space, according to the mapping coordinates of the mapping point, comprises:

determining the tetrahedron where the mapping point is located, and taking each vertex of the tetrahedron as the reference point; and taking the coordinates of the reference point in the sampling point space as the first color coordinates of the reference point;

determining target color coordinates of each of the plurality of reference points, according to the first color coordinates of the reference point and a color mapping table, wherein the color map is generated through the method according to claim 1; and acquiring corrected color data of the pixel through an interpolation algorithm, according to the target color coordinates of the plurality of reference points, wherein the acquiring corrected color data of the pixel through an interpolation algorithm, according to the target color coordinates of the plurality of reference points, comprises:

acquiring the corrected color data of the pixel according to the following formula:

$$\hat{f}(p) = [f(p_0)f(p_1)f(p_2)f(p_3)]\begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix}^{-1}\begin{bmatrix} x \\ y \\ z \\ 1 \end{bmatrix},$$

27 wherein p represents the mapping point, and $p_0$, $p_1$, $p_2$ and $p_3$ represent the vertices of the tetrahedron where the mapping point is located; $\hat{f}(p)$ is the corrected color data; $f(p_0)$, $f(p_1)$, $f(p_2)$, and $f(p_3)$ are the target color coordinates of the four vertices of the tetrahedron, respectively; $(x_0, y_0, z_0)$ are coordinates of the vertex $p_0$ with respect to a datum point; $(x_1, y, z)$ are coordinates of the vertex $p_1$ with respect to the datum point, $(x_2, y_2, z_2)$ are coordinates of the vertex $p_2$ with respect to the datum point, $(x_3, y_3, z_3)$ are coordinates of the vertex $p_3$ with respect to the datum point; and $(x, y, z)$ are coordinates of the first mapping point with respect to the datum point, wherein the datum point is one of the four vertices of the tetrahedron where the mapping point is located.

9. An apparatus for generating a color mapping table, comprising:
  a space establishing module configured to establish a sampling point space according to first color coordinates of a plurality of sampling points in a first color space; and
  a processing module configured to perform steps of a preset processing on each of the plurality of sampling points, to obtain target color coordinates of the sampling point in the first color space, and generate the color mapping table according to the first color coordinates and the target color coordinates of the plurality of sampling points, wherein the steps of the preset processing on each of the plurality of sampling points comprise:
    taking the sampling point as a source sampling point, and determining a target sampling point corresponding to the source sampling point,
    wherein the taking the sampling point as a source sampling point, and determining a target sampling point corresponding to the source sampling point, comprises:
    taking the sampling point as the source sampling point, and determining theoretical color coordinates of the source sampling point in a second color space, according to a rule of a standard conversion between the first color space and the second color space; and
    determining the target sampling point corresponding to the source sampling point, according to actual color coordinates, in the second color space, of at least a part of the plurality of sampling points in the sampling point space and the theoretical color coordinates,
    wherein the determining the target sampling point corresponding to the source sampling point, according to actual color coordinates, in the second color space, of at least a part of the plurality of sampling points in the sampling point space and the theoretical color coordinates, comprises: performing at least one target search process, wherein each of the at least one target search process comprises:
    determining a search area of a sphere, by taking a first sampling point as a center of the sphere and a first preset value as a radius of the sphere;
    if a coordinate difference between the actual color coordinates, in the second color space, of at least one sampling point in the search area of the sphere and the theoretical color coordinates is less than a preset threshold value, taking one of the at least one sampling point as the target sampling point; and
    otherwise, determining whether a current target search process is in an Nth target search process, if so, taking the sampling point corresponding to a minimum coordinate difference obtained in previous N target search processes as the target sampling point; if not, getting into a next target search process,
  wherein N is a preset integer greater than 1; the first sampling point in a first target search process is the source sampling point; in each target search process subsequent to the first target search process, the first sampling point is the sampling point corresponding to the minimum coordinate difference obtained in a previous target search process,
  wherein the actual color coordinates of the sampling point in the second color space are determined according to at least display attribute information of the display panel and the first color coordinates of the sampling point; and
  processing the target sampling point to obtain the target color coordinates,
  wherein the processing the target sampling point, to obtain the target color coordinates, comprises:
  performing a non-linear conversion on the first color coordinates of the target sampling point, according to video display standard in the display panel, to obtain linear coordinates of the target sampling point; and
  performing non-linear conversion on the linear coordinates according to the display attribute information, to obtain the target color coordinates.

10. An apparatus for correcting color, comprising:
  a conversion module configured to convert, in response to original color data of a pixel, the original color data to first color coordinates in a first color space;
  a reference point acquisition module configured to map the first color coordinates of the original color data to a sampling point space, to obtain a mapping point corresponding to the first color coordinates of the original color data in the sampling point space, and determine the first color coordinates, in the first color space, of a plurality of reference points corresponding to mapping coordinates of the mapping point, according to the mapping coordinates of the mapping point,
  wherein the sampling point space comprises a plurality of sampling cubes, each of the plurality of sampling cubes is defined by eight sampling points as vertices of the sampling cube, and the sampling cube is divided into a plurality of tetrahedrons; and
  the reference point acquisition module is configured to:
  determine the tetrahedron where the mapping point is located, and take each vertex of the tetrahedron as the reference point; and
  take the coordinates of the reference point in the sampling point space as the first color coordinates of the reference point;
  a target color determination module configured to determine target color coordinates of each of the plurality of reference points, according to the first color coordinates of the reference point and a color mapping table, wherein the color map table is generated through the apparatus according to claim 9; and
  an interpolation module configured to acquire corrected color data of the pixel through an interpolation algorithm, according to the target color coordinates of the plurality of reference points,
  wherein interpolation module is configured to:
  acquire the corrected color data of the pixel according to the following formula:

$$\hat{f}(p) = [f(p_0)f(p_1)f(p_2)f(p_3)]\begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix}^{-1}\begin{bmatrix} x \\ y \\ z \\ 1 \end{bmatrix},$$

wherein p represents the mapping point, and $p_0$, $p_1$, $p_2$ and $p_3$ represent the vertices of the tetrahedron where the mapping point is located; $\hat{f}(p)$ is the corrected color data; $f(p_0)$, $f(p_1)$, $f(p_2)$, and $f(p_3)$ are the target color coordinates of the four vertices of the tetrahedron, respectively; $(x_0, y_0, z_0)$ are coordinates of the vertex $p_0$ with respect to a datum point; $(x_1, y_1, z_1)$ are coordinates of the vertex $p_1$ with respect to the datum point, $(x_2, y_2, z_2)$ are coordinates of the vertex $p_2$ with respect to the datum point, $(x_3, y_3, z_3)$ are coordinates of the vertex $p_3$ with respect to the datum point; and $(x, y, z)$ are coordinates of the first mapping point with respect to the datum point, wherein the datum point is one of the four vertices of the tetrahedron where the mapping point is located.

11. A non-transitory computer readable medium storing a computer program which, when being executed by a processor, cause the processor to perform the method according to claim 1.

12. A display device, comprising:

one or more processors; and a memory for storing one or more programs which, when being executed by the one or more processors, cause the one or more processors to perform the method according to claim 1.

13. A non-transitory computer readable medium storing a computer program which, when being executed by a processor, cause the processor to perform the method according to claim 8.

14. A display device, comprising:

one or more processors; and a memory for storing one or more programs which, when being executed by the one or more processors, cause the one or more processors to perform the method according to claim 8.

* * * * *